United States Patent [19]

Paoli

[11] Patent Number: 4,953,794
[45] Date of Patent: Sep. 4, 1990

[54] SINGLE PROCESS DESINEWING AND DEBONING MACHINE AND METHOD

[76] Inventor: Stephen A. Paoli, 1006 Highview Ave., Rockford, Ill. 61108

[21] Appl. No.: 46,435

[22] Filed: May 4, 1987

Related U.S. Application Data

[63] Continuation-in-part of Ser. No. 511,102, Ser. No. 695,137, and Ser. No. 820,248.

[51] Int. Cl.⁵ ............................................. B02C 19/12
[52] U.S. Cl. .................................... 241/24; 241/68; 241/243
[58] Field of Search .............. 241/242, 68, 243, 260.1, 241/261, 24, 30

[56] References Cited

U.S. PATENT DOCUMENTS

| 2,468,613 | 4/1949 | Bjorklund | 241/260.1 X |
| 3,514,808 | 6/1970 | Alldred, Jr. et al. | 241/68 X |
| 3,659,638 | 5/1972 | Paoli | 241/74 |
| 3,917,180 | 11/1975 | Paoli | 241/68 X |
| 4,018,389 | 4/1977 | Paoli | 241/68 X |

FOREIGN PATENT DOCUMENTS

| 108471 | 7/1943 | Sweden | 241/242 |
| 380273 | 7/1973 | U.S.S.R. | 241/243 |

Primary Examiner—Joseph M. Gorski

[57] ABSTRACT

Improved mechanical processing machines and methods for separating animal, fruit or vegetable meat from bone, cartilage, sinew, skin, stems, seeds and other hard or tough tissue. The equipment and method involved pulling, cutting pressing, wedging and forcing unground raw material into a wedge shaped pocket and separating it mechanically into edible meat forced between closely spaced helical cutting elements where it is collected, and into waste material on the outside of the helical cutting elements which eject it.

20 Claims, 21 Drawing Sheets

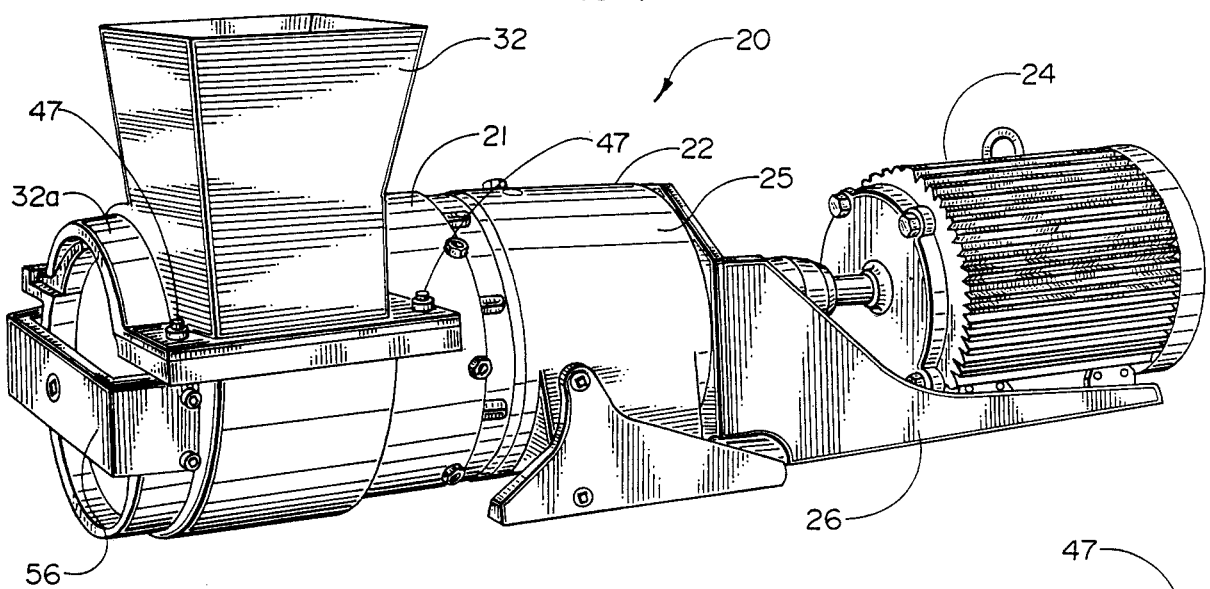
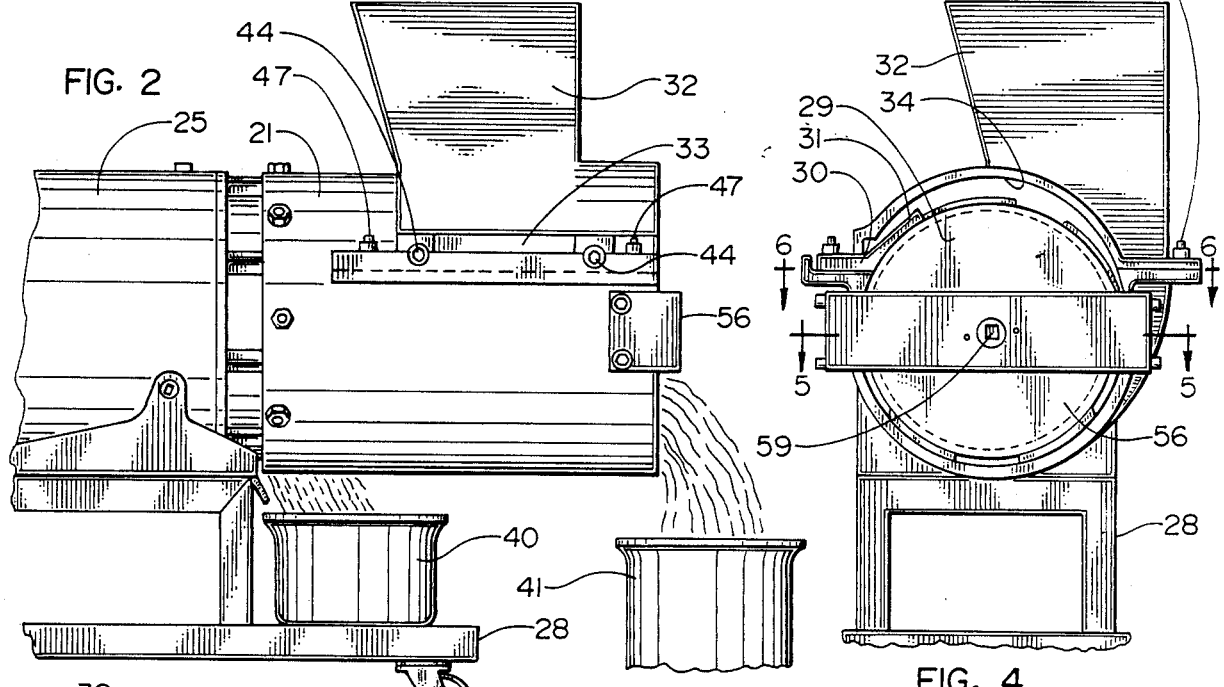
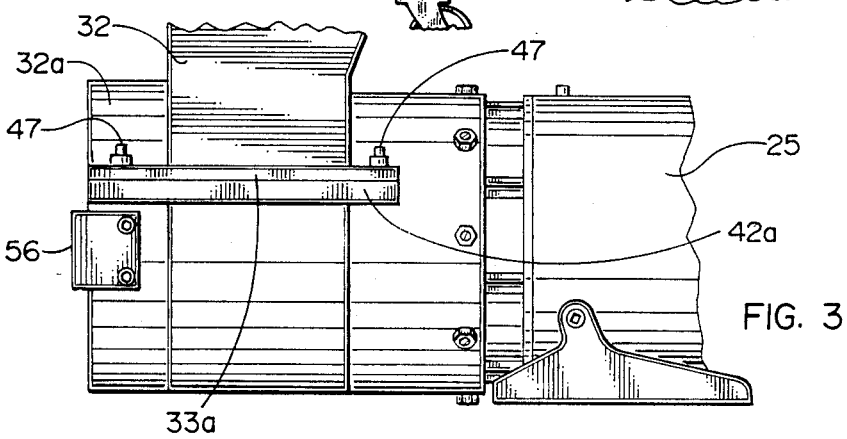

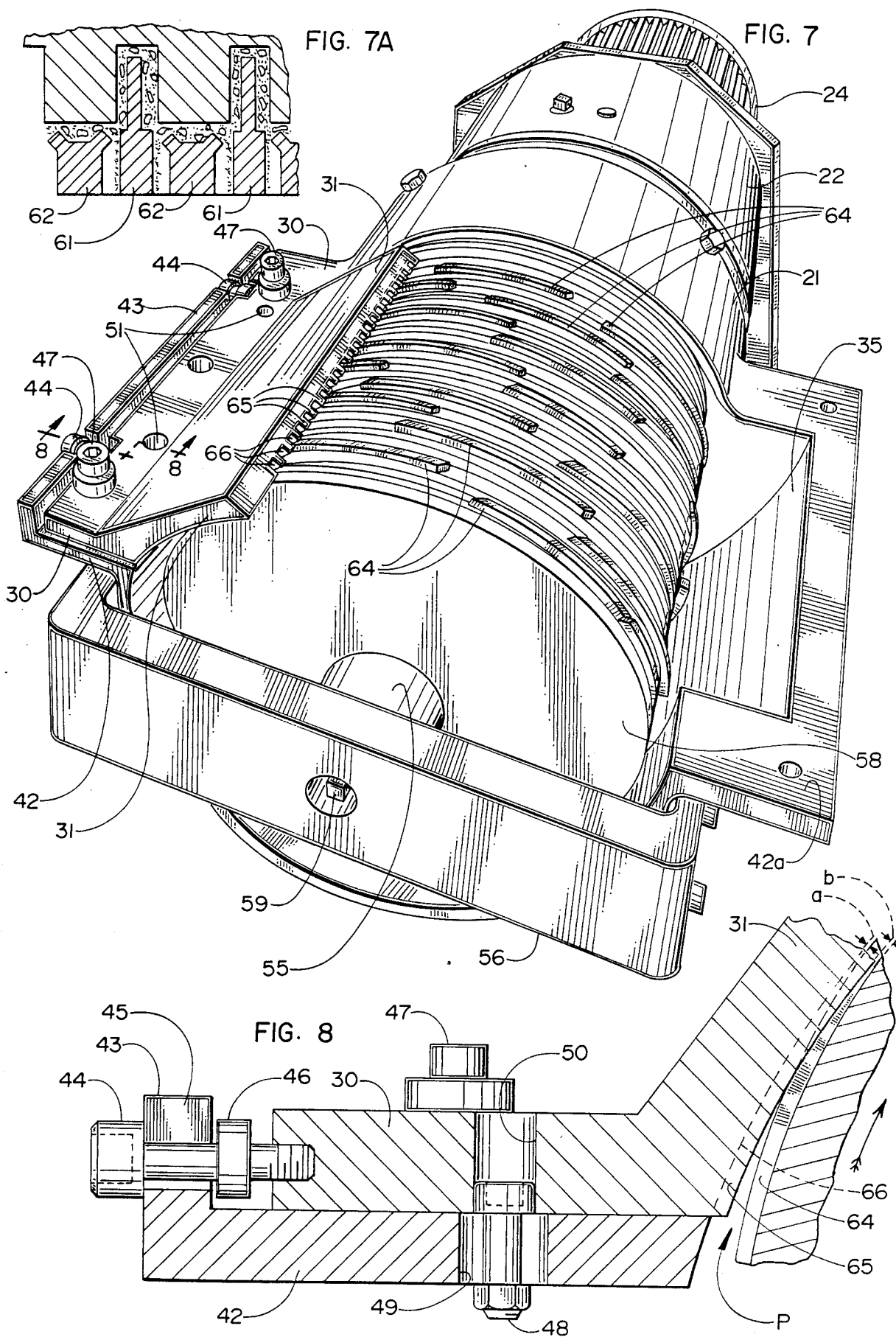

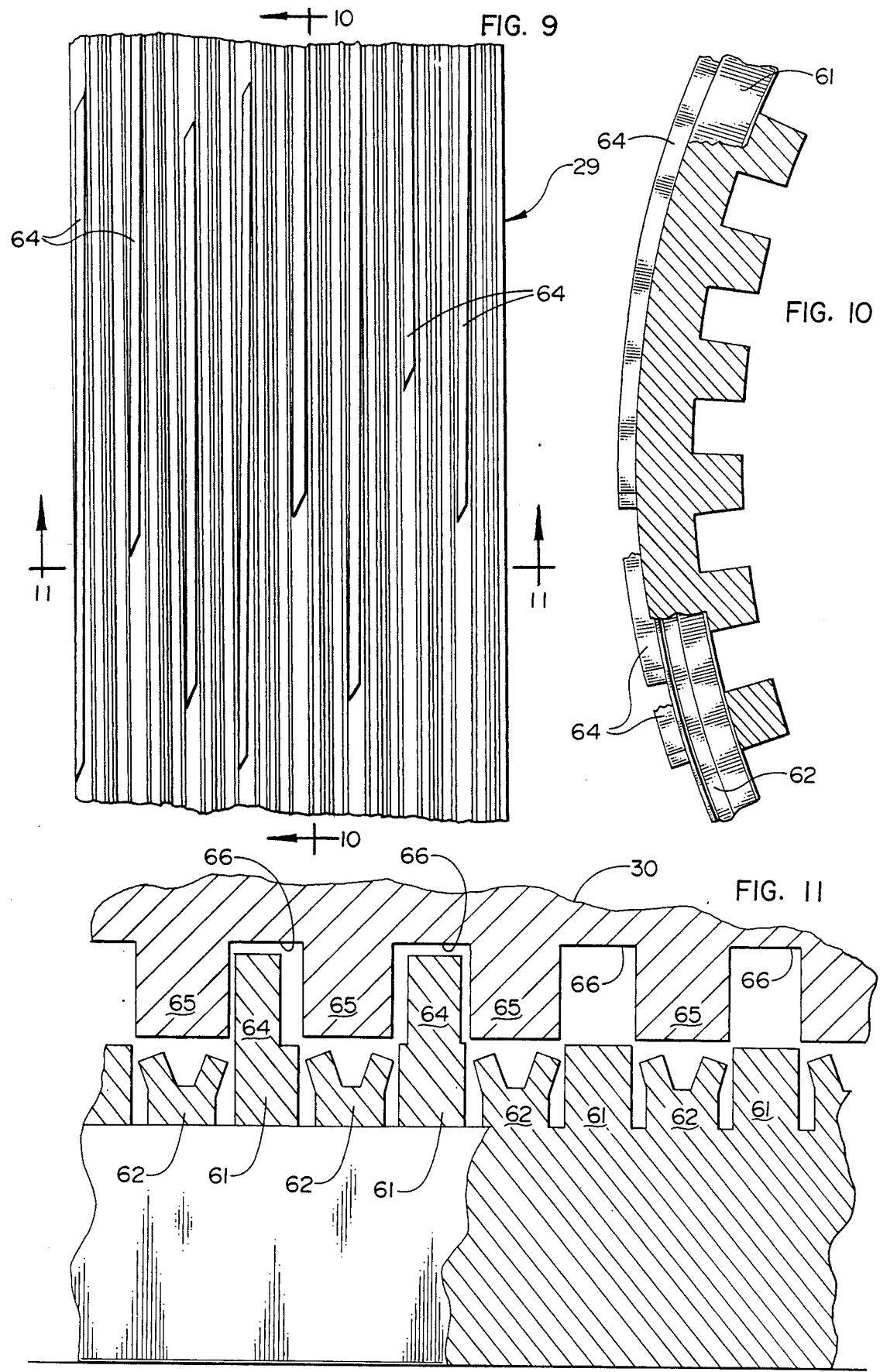

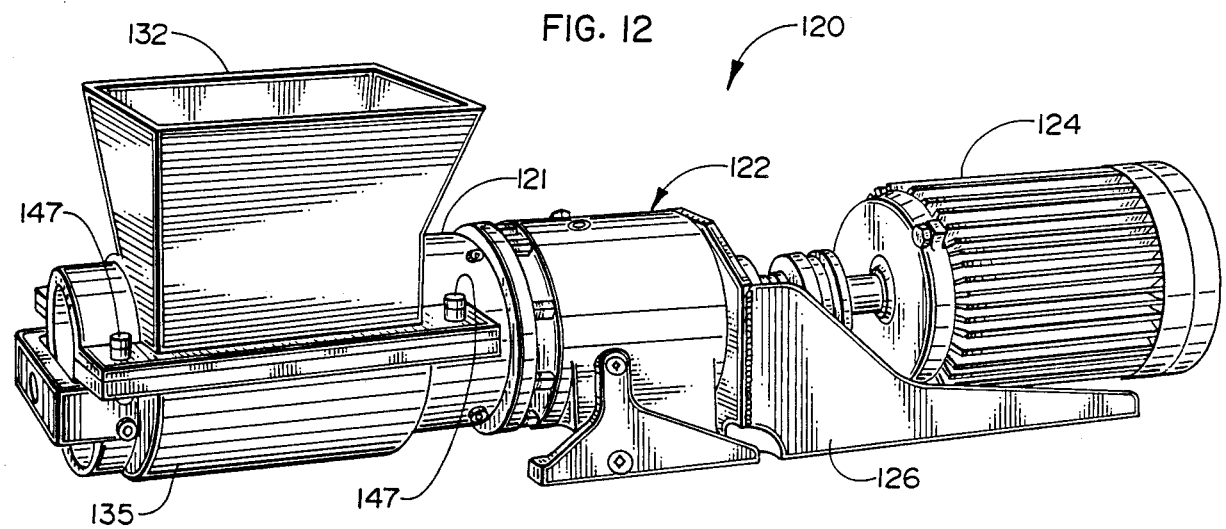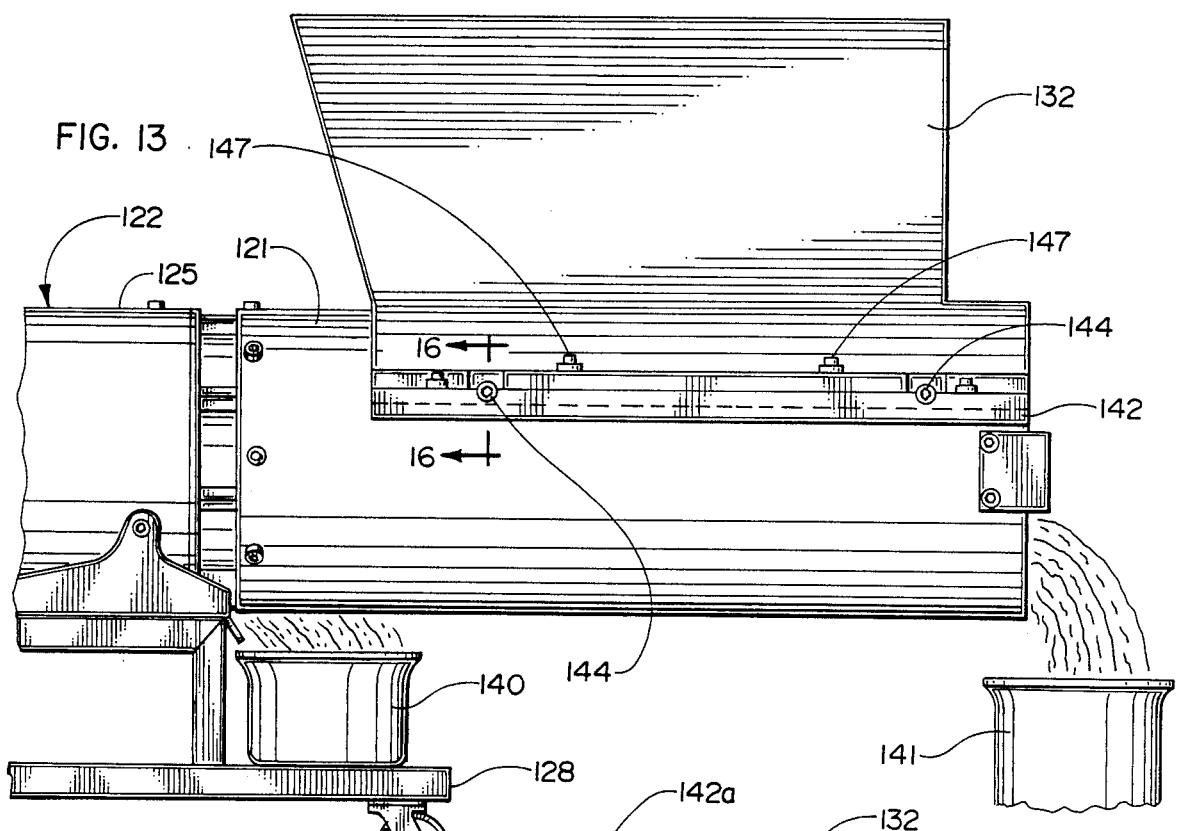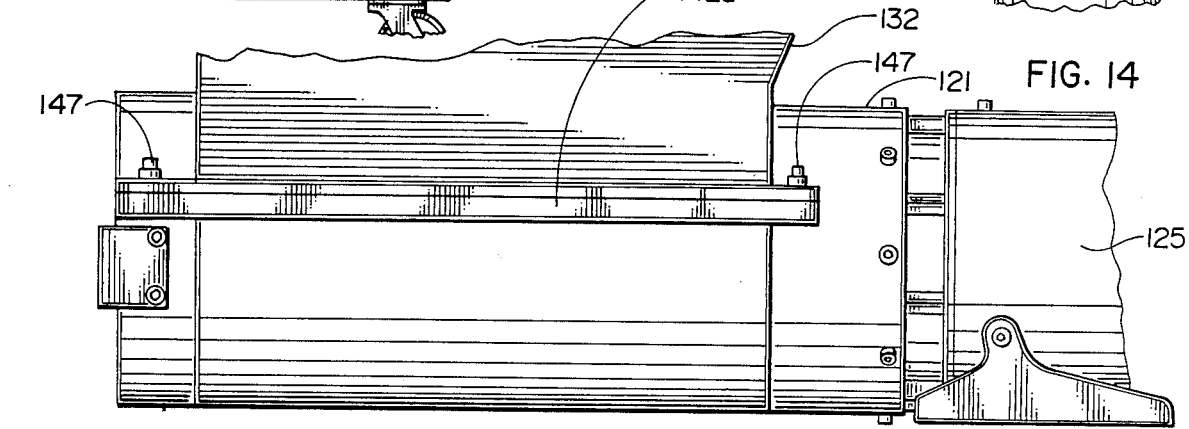

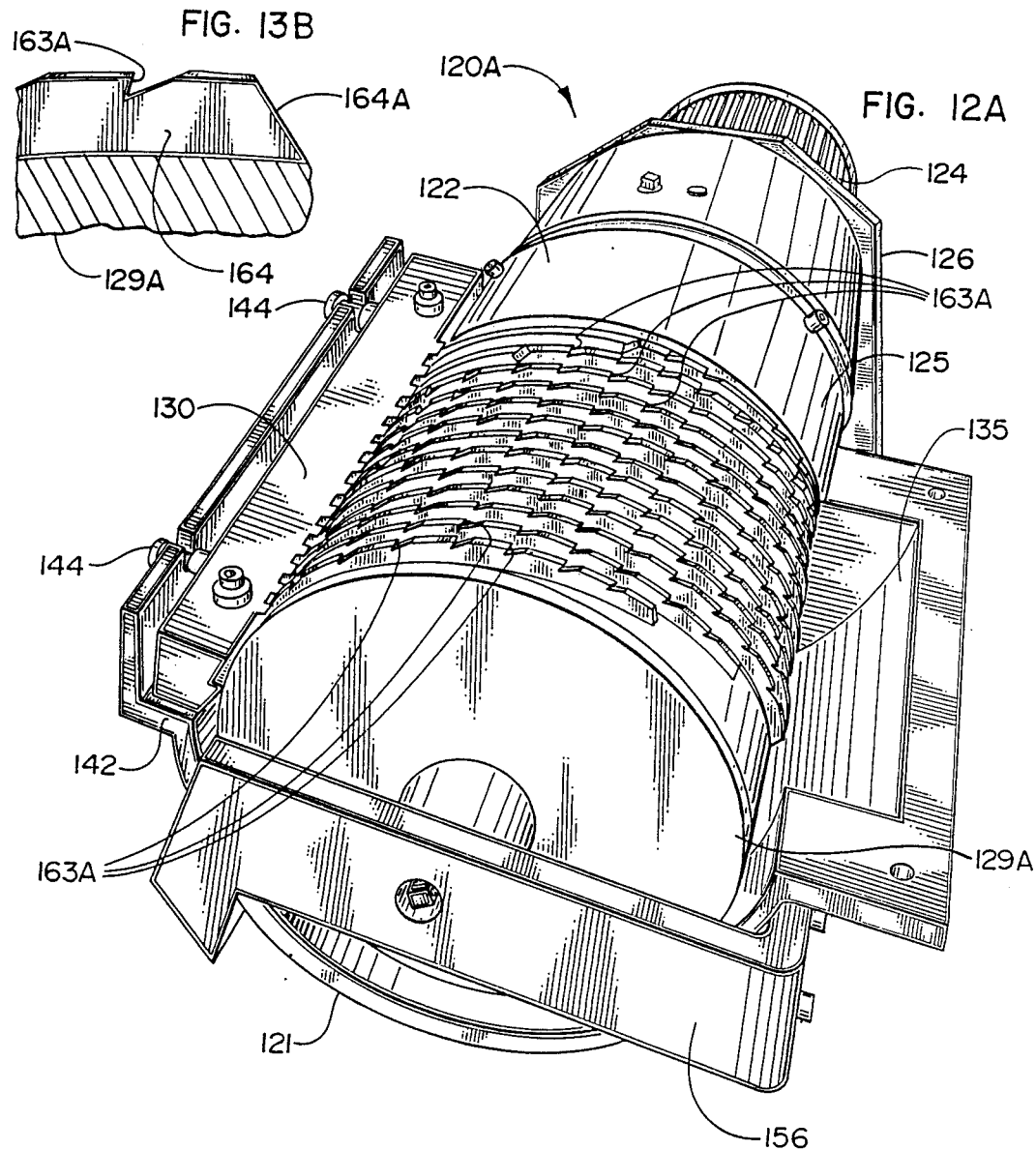
FIG. 13B
FIG. 12A
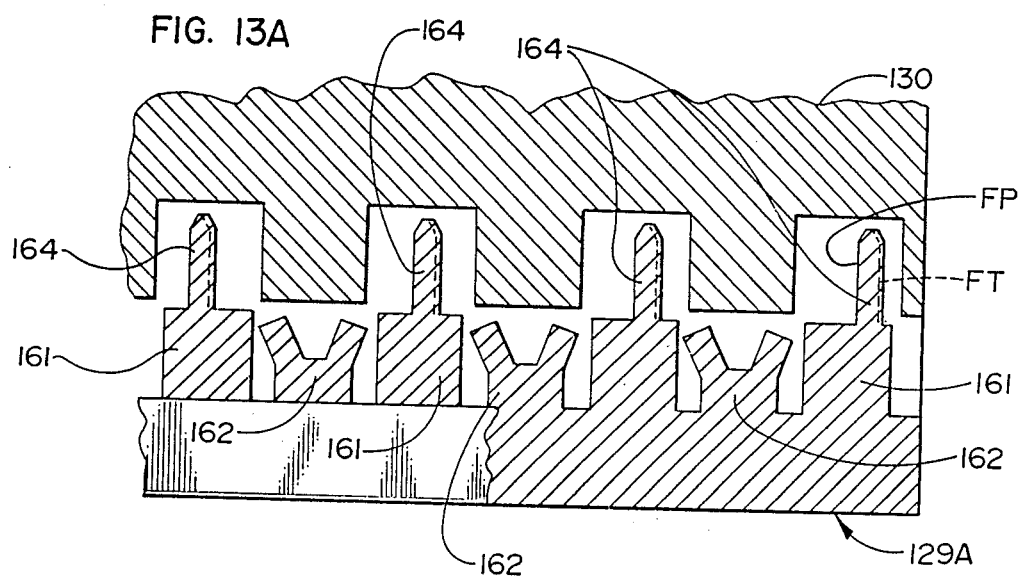
FIG. 13A

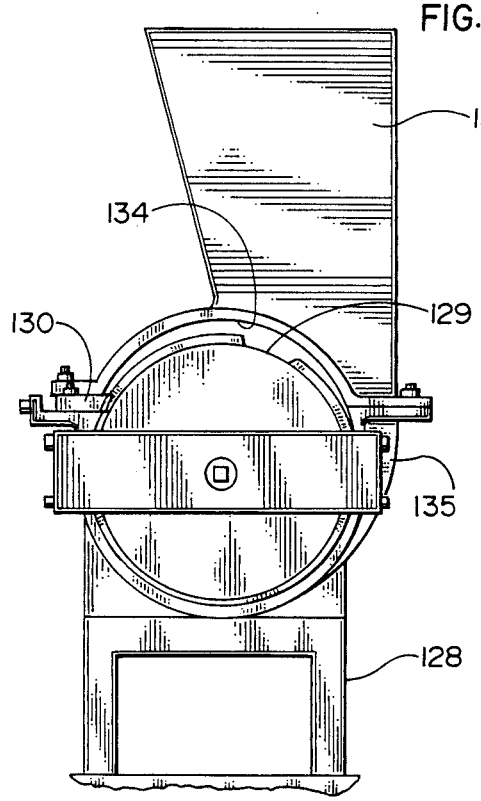
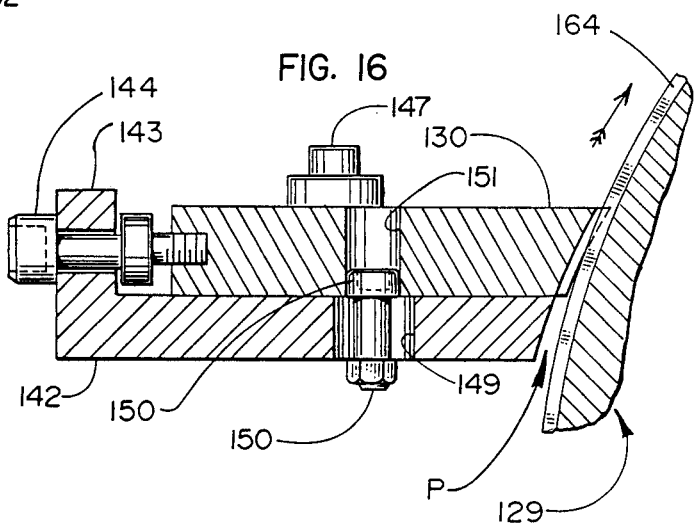
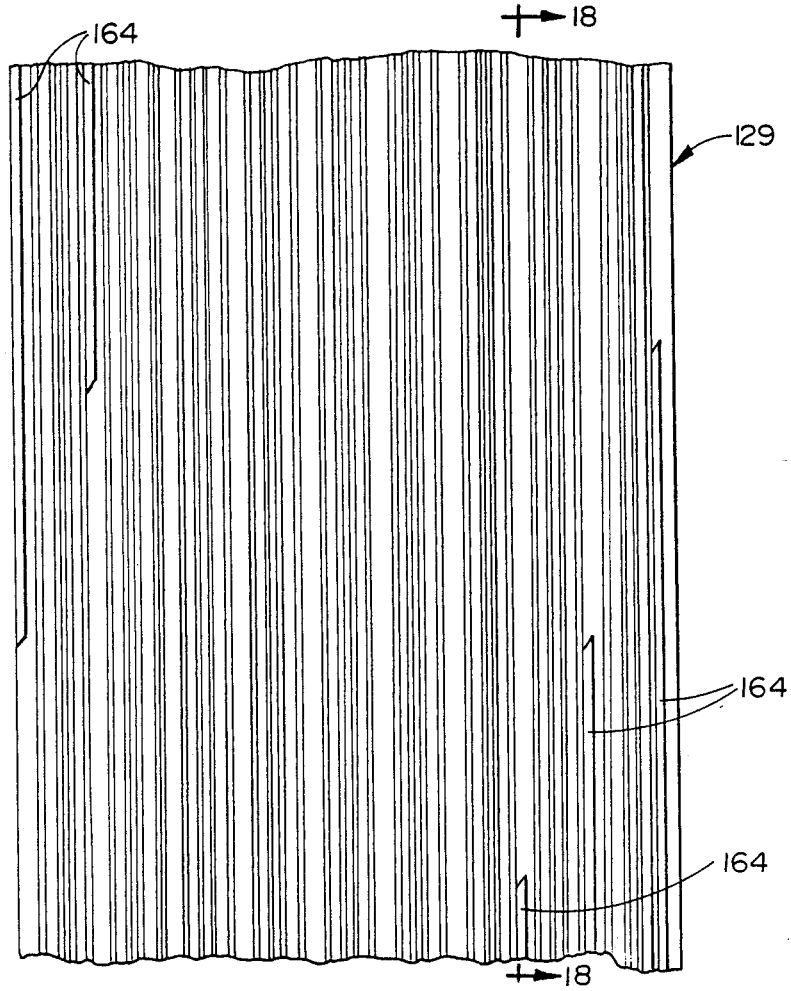
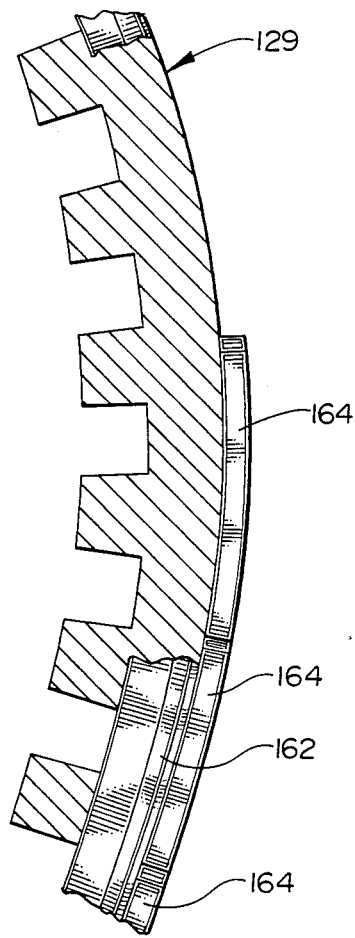

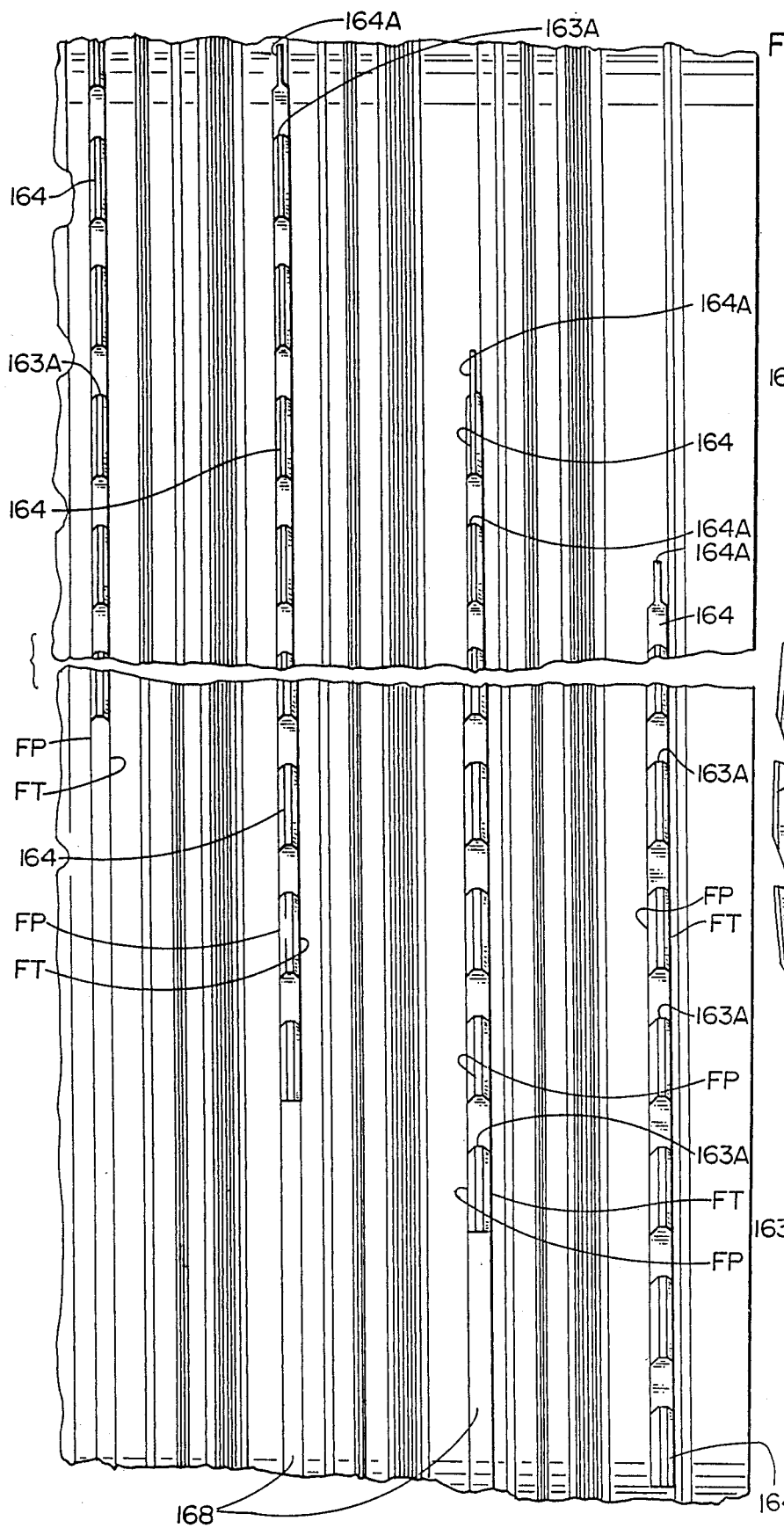
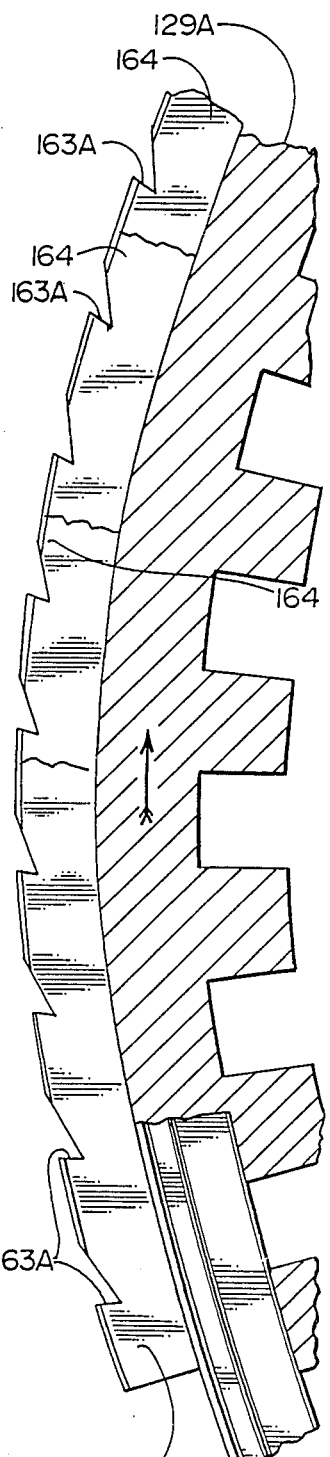
FIG. 16A
FIG. 17A

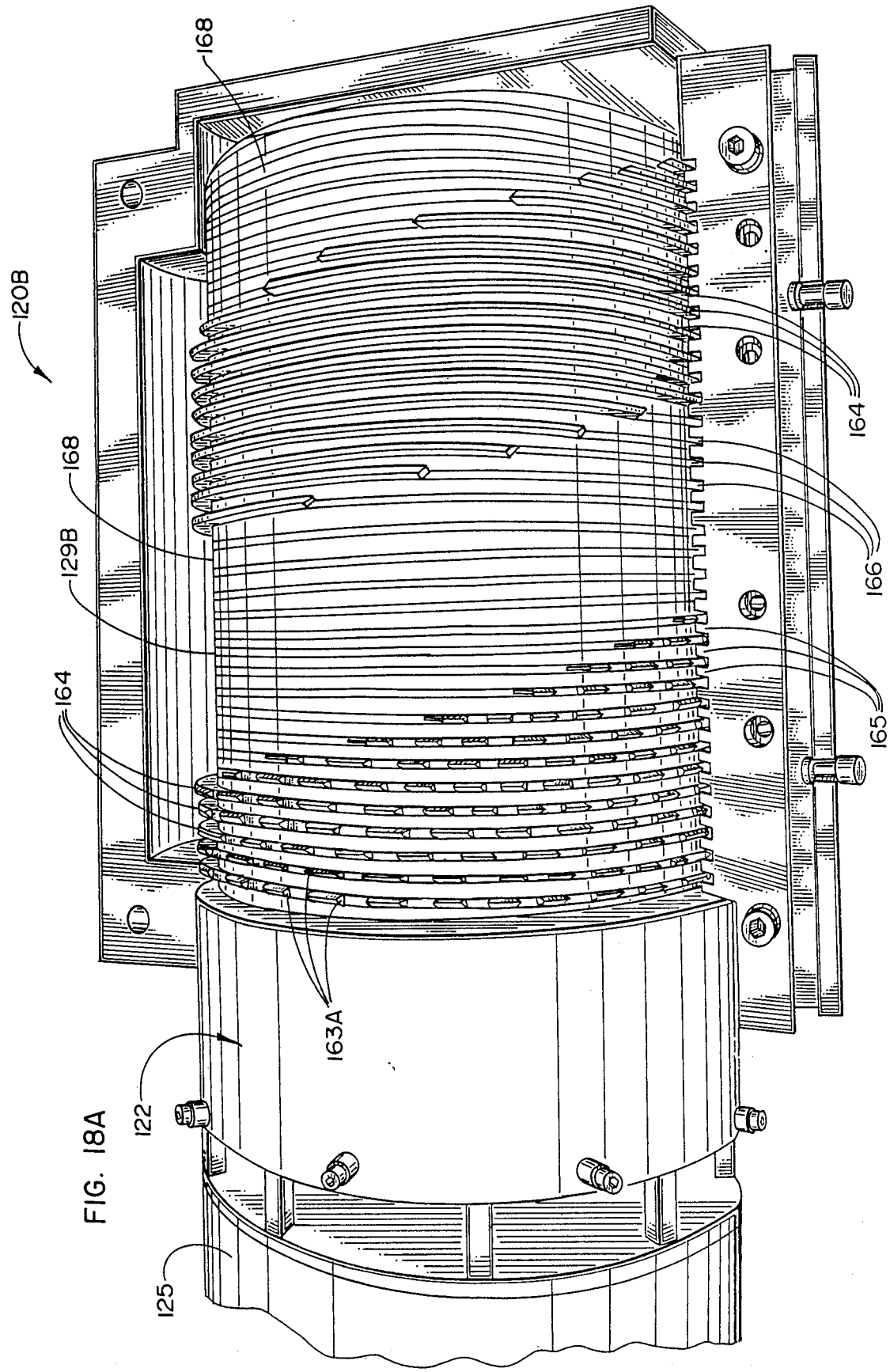

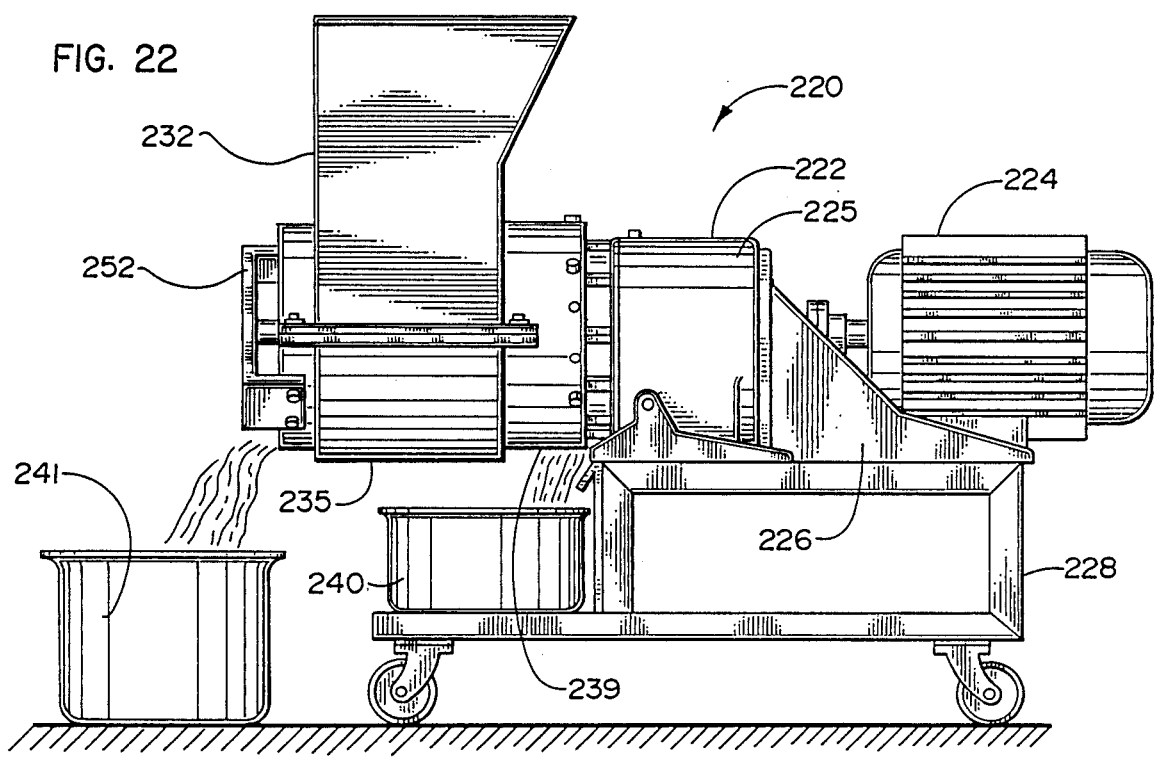
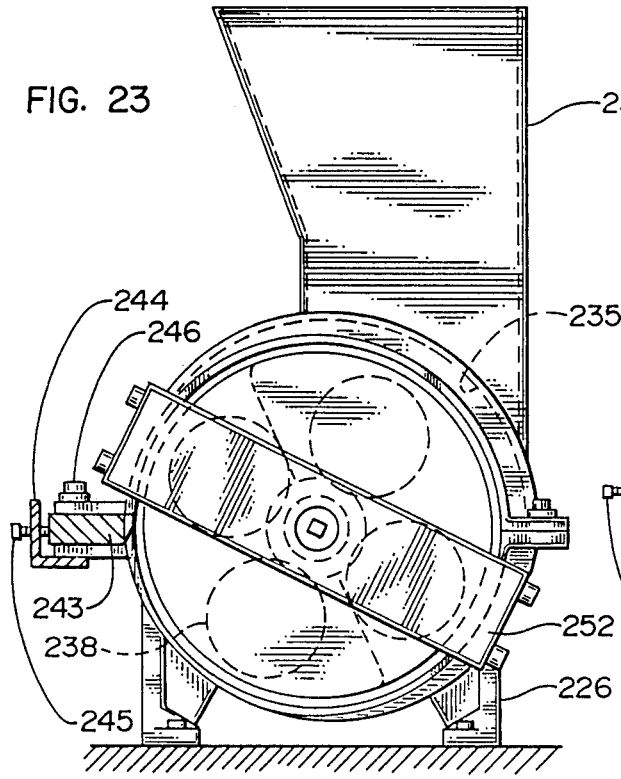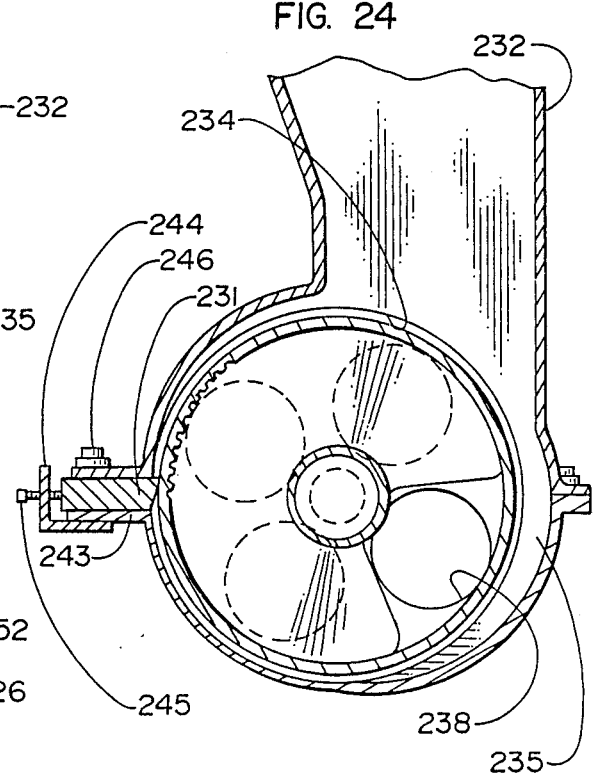

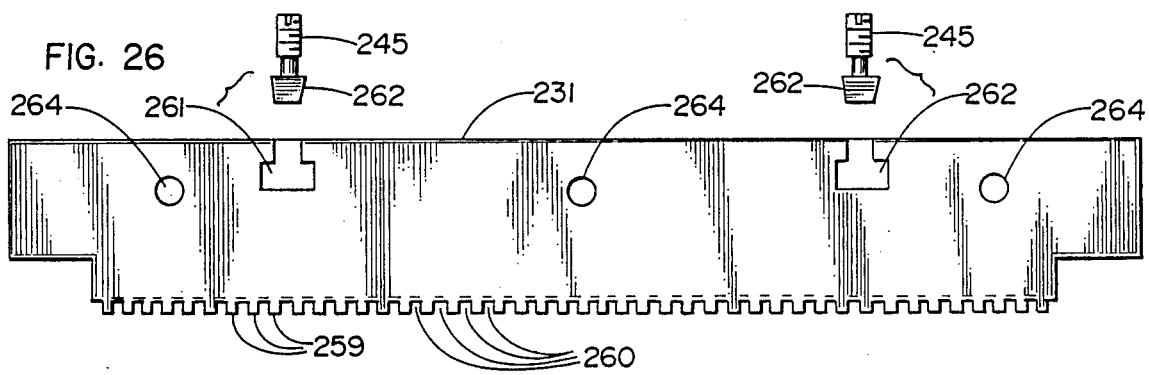
FIG. 26
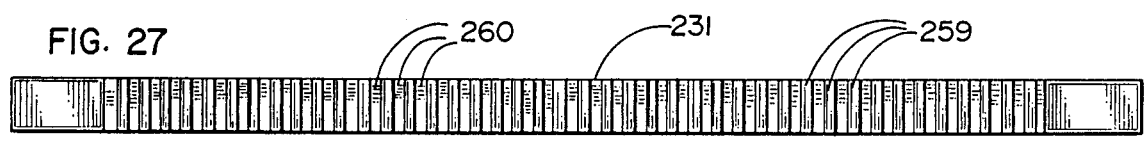
FIG. 27
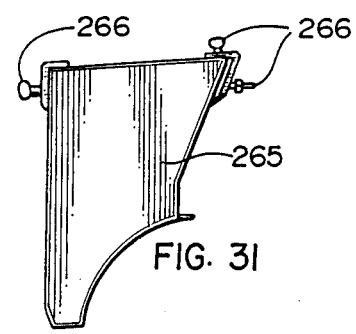
FIG. 28
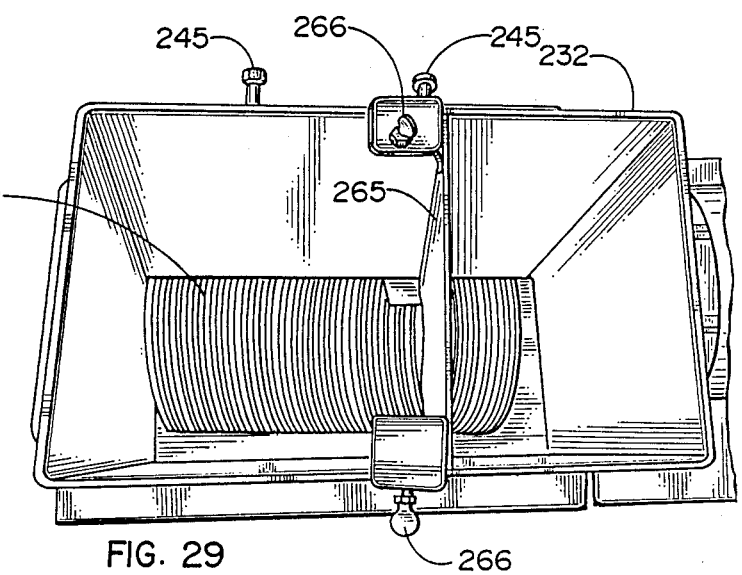
FIG. 29
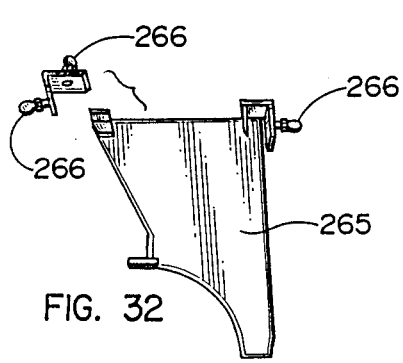
FIG. 31
FIG. 32
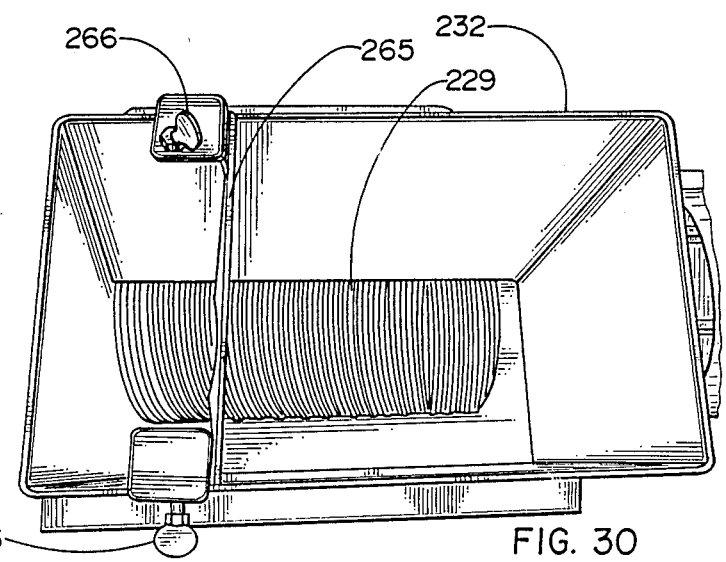
FIG. 30

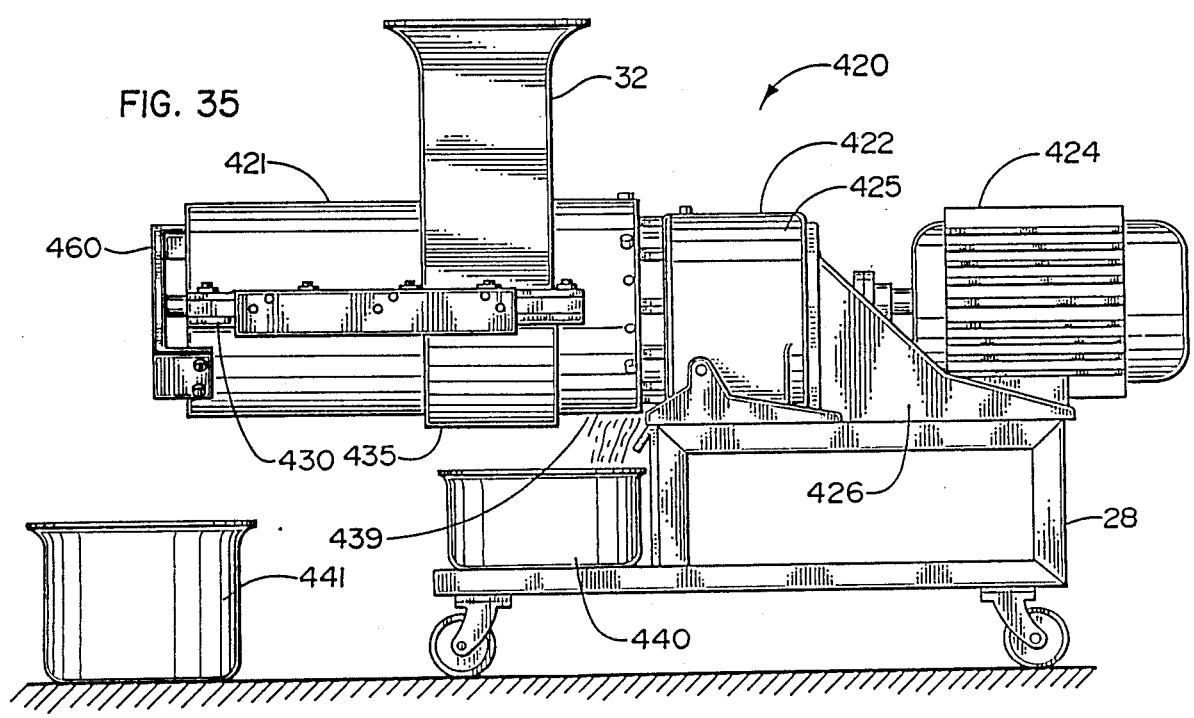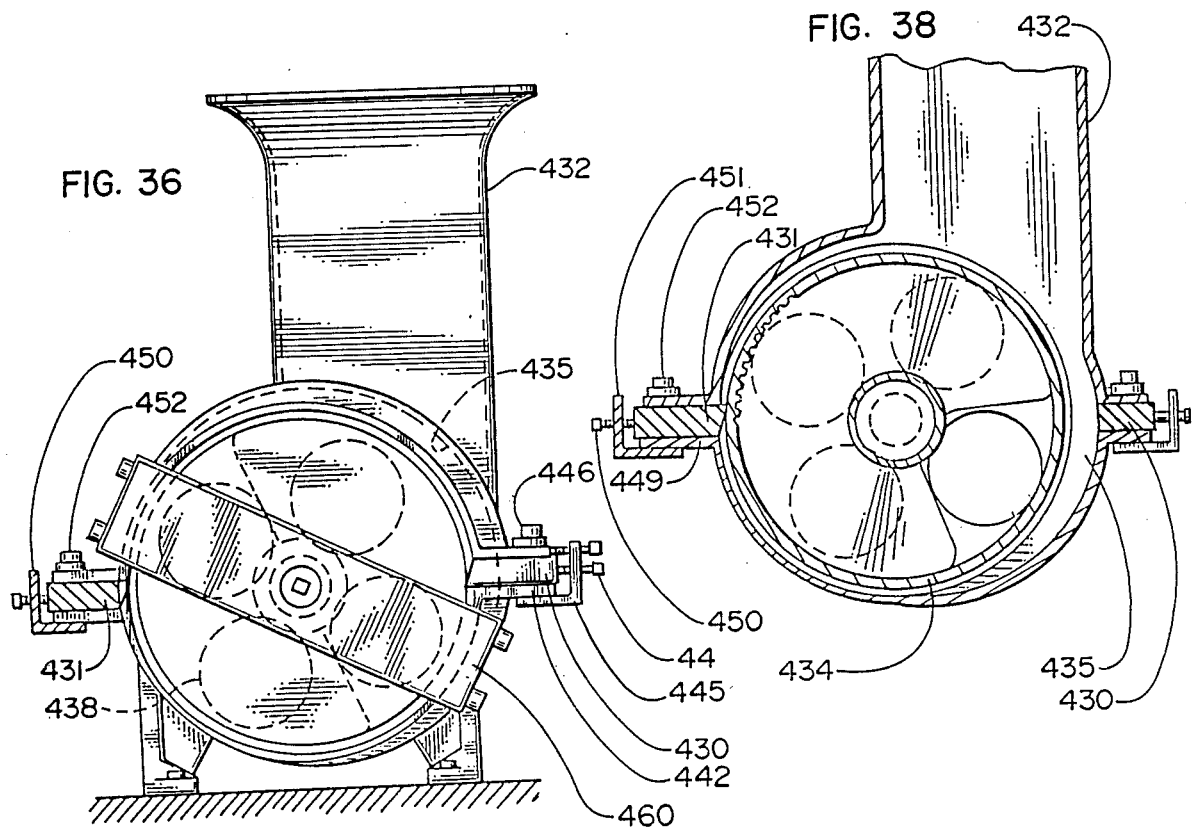

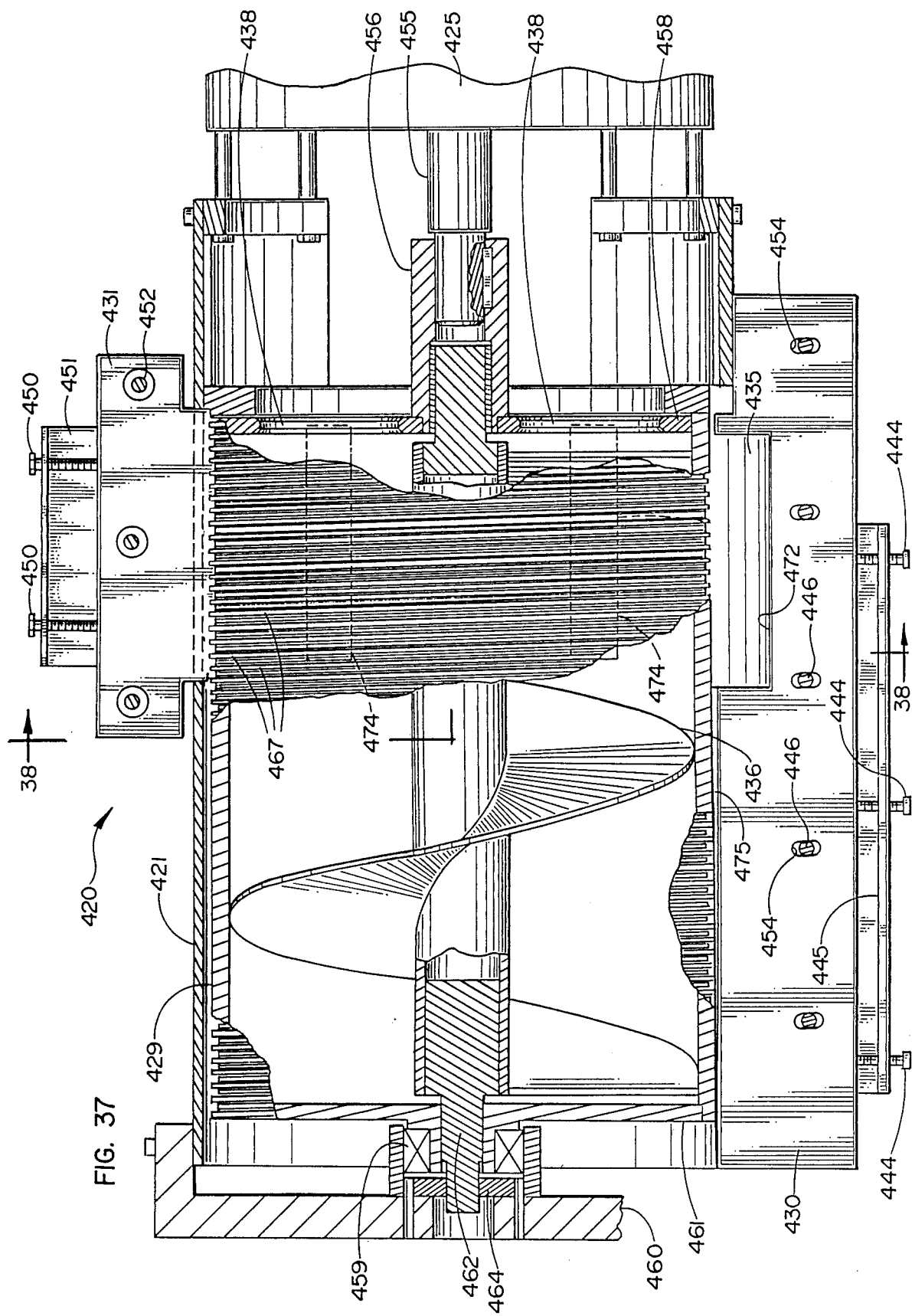

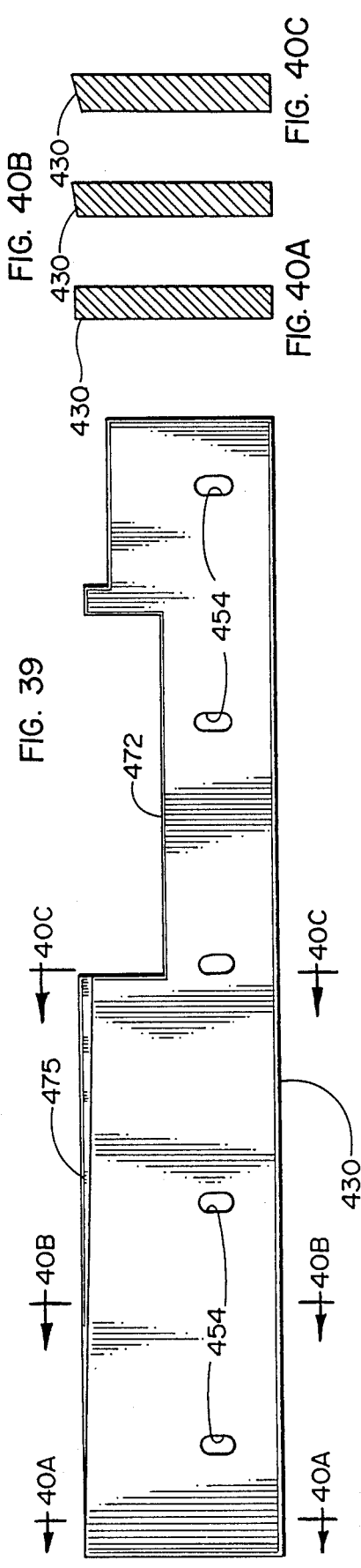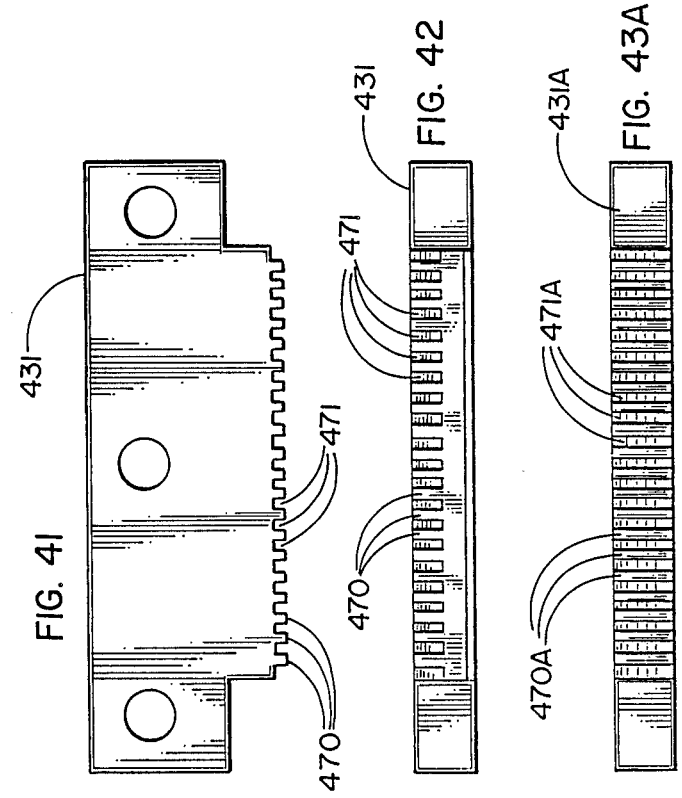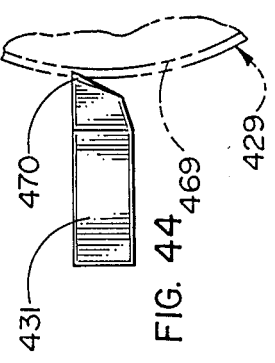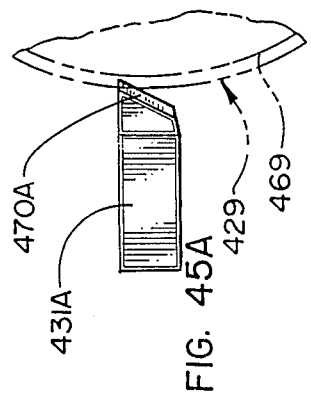

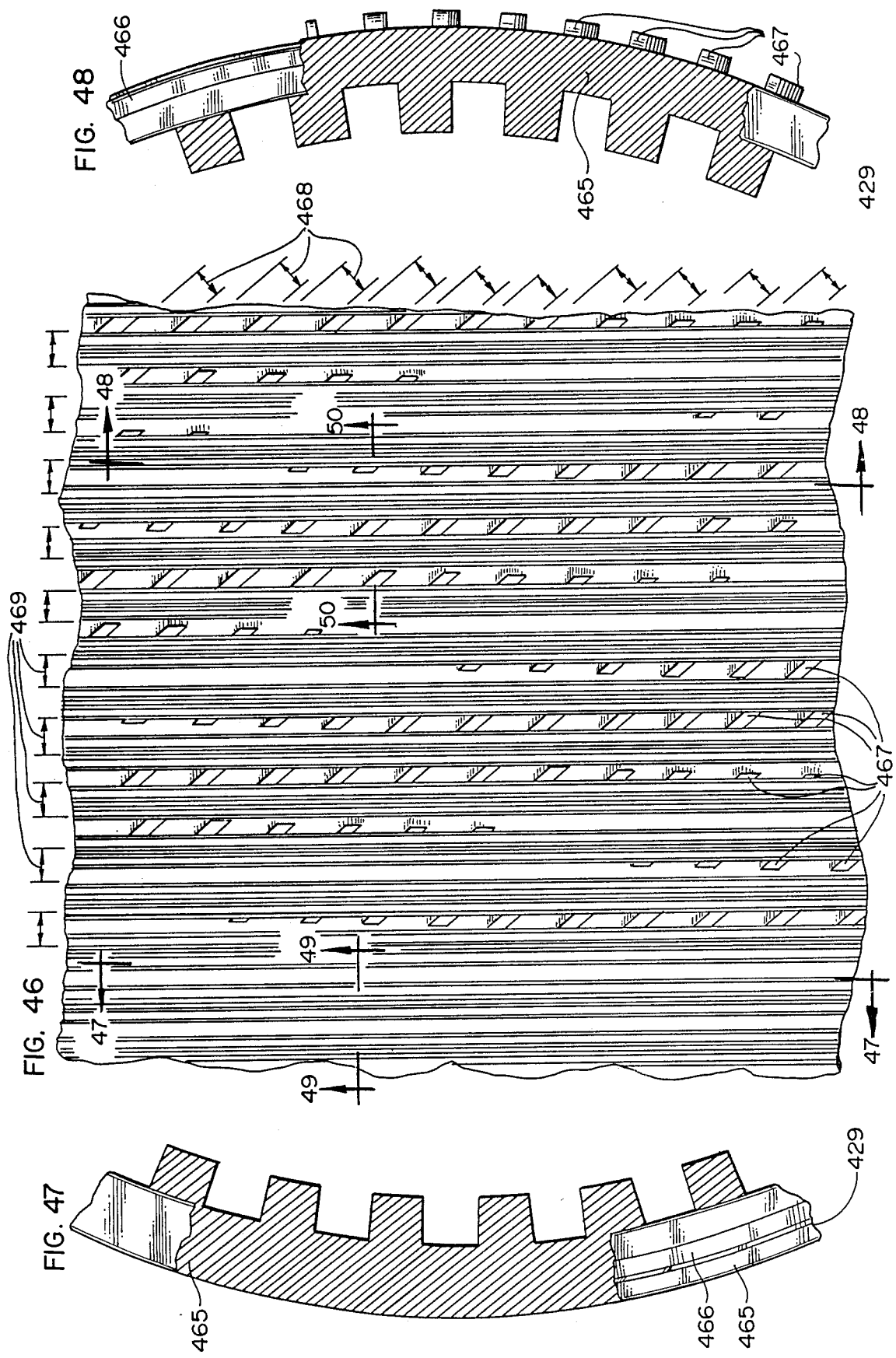

SINGLE PROCESS DESINEWING AND DEBONING MACHINE AND METHOD

BACKGROUND OF THE INVENTION

This application is a continuation-in-part of my prior U.S. applications, Serial Nos. 511,102, filed July 6, 1983; 695,137, filed Jan. 24, 1985; and 820,248, filed Jan. 21, 1986, each now abandoned.

The present invention relates generally to food processing machinery and, more specifically, to mechanical desinewing machines, deboning machines, and a method for desinewing and deboning. Equipment of this type is now meeting with increasing acceptance in the food industry, both in this country and abroad. It is used for processing meat animal carcasses, poultry, fish, shellfish, certain fruits and vegetables, and various parts of such items.

Heretofore, it has been necessary to pass the raw material through a coarse grinding machine before feeding it into a mechanical deboning machine to separate the edible meat from the fragments of bone, sinew and other hard tissue. The grinder crushes the material by means of an auger and forces it through a coarse orifice plate from which it exits as an agglomeration of hard and soft tissues which is then fed into the mechanical deboning machine or separator. The coarse grinding step generates substantial frictional heat with a resulting undesirable increase in the temperature of the raw material presented to the deboning machine. This temperature increase tends to carry over to the end products discharged from the machine. The coarse grinding step is also uneconomical because it requires additional equipment, labor and processing time which are necessarily reflected in the price of the products produced.

SUMMARY OF THE INVENTION

The invention described herein represents an improvement over the deboning machines disclosed and claimed in my prior U.S. Pat. Nos. 3,266,542 and 3,266,543, both issued August 16, 1966; 3,524,487 issued Aug. 18, 1970; 3,552,461 issued Jan. 5, 1971; 3,659,638 issued May 2, 1972; 3,851,828 issued Dec. 3, 1974; 3,857,518 issued Dec. 31, 1974; 3,917,180 issued Nov. 4, 1975; 3,958,763 issued May 25 1976; and 4,018,389 issued Apr. 19, 1977.

One object of the present invention is to provide a mechanical desinewing machine adapted to process raw meat from which the large bones have been manually removed and to separate the edible meat from the entrained sinew, ligaments, gristle, and cartilage remaining in the meat following manual removal of the large bones.

Another object of the present invention is to provide a mechanical deboning machine adapted to handle raw material in the form of whole pountry or fish carcasses, shellfish, and bone-in cuts of beef, pork or lamb, and certain fruits and vegetables, without first subjecting such material to a separate coarse grinding step outside the deboning machine.

A further object of the invention is to provide a mechanical desinewing machine and deboning machines of the above type capable of operating continuously at high production rates without objectionable temperature build-up in the products produced and without necessity for introduction of a cooling medium into the machines.

Another object is to provide a desinewing machine and deboning machines of the foregoing character which operate at substantially higher production rates and higher efficiency than the machines disclosed in the prior patents noted above.

Still another object of the invention is to provide a machine of the type set forth above which may be readily disassembled for cleaning and maintenance and reassembled by unskilled labor with a minimum of down time.

A further object of the invention is to provide a method of desinewing and deboning which yields edible meat from poultry, fish, meat animals, or certain fruits and vegetables, and which rejects fragments of bone, sinew, cartilage, fibrous material, and other hard tissue.

In keeping with the foregoing objects, a desinewing machine illustratively embodying the invention is shown in FIGS. 1-11 and described herein. This machine is adapted to process an agglomeration of red meat containing sinew, cartilage, ligaments and connective tissue from which the large bones have been manually removed. In a single operation, the machine separates the edible meat from such agglomeration; directs it to a receiving receptacle; and ejects the sinew and related hard tissue into a waste collecting means.

Also in keeping with the objects set forth above, five single operation deboning machines embodying the present invention are shown and described herein. These machines are illustrated, respectively, in FIGS. 12-21, 12A-12G, 22-25, 26-34, and 35-50. Each of these deboning machines is adapted to break up the raw material fed in to it, to separate the broken raw material into edible comminuted meat without perceptible bone, and into waste consisting of fragmented bone and other hard tissue.

The desinewing and deboning machines described herein bear some similarity to the machine of my prior U.S. Pat. No. 4,018,389, supra, in that they include:

(a) a hollow, power driven rotor having two closely spaced sets of helical cutting elements defining constricted helical passages communicating with the interior of the rotor;

(b) one set of cutting elements having a substantially greater radial length than the other set.

They differ, however, from the machine of the '389 patent in that they include the following important features:

(c) a plurality of raised teeth defined in certain of the radially longer cutting elements, lying in planes substantially perpendicular to the rotor axis, and extending radially into the space between the teeth of the pressure/breaker bar;

(d) said a pressure/breaker bar being fixed closely adjacent said rotor having a set of teeth interdigitated with the set of teeth on the rotor; and (e) The pressure/breaker bar defining with respect to the peripheral surface of the rotor a wedge shaped pocket decreasing in size in the direction of rotor movement.

Other objects and advantages of the invention will become apparent from the following description, taken together with the accompanying drawings.

BRIEF DESCRIPTION OF THE DRAWINGS

FIG. 1 is a perspective view of an illustrative desinewing machine the present invention.

FIGS. 2 and 3 are enlarged, fragmentary elevational views of opposite sides of the machine of FIG. 1.

FIG. 4 is in elevational view of the outer end of the machine shown in FIGS. 1-3.

FIG. 7 is an enlarged perspective view through the active portion of the machine of FIG. 1 detailing the rotor and breaker bar.

FIG. 7A is a diagramnmatic view illustrating the cutting, squeezing and waste ejection action which takes place in the desinewing machine of FIG. 1.

FIG. 8 is a further enlarged, fragmentary sectional view taken transversely through the breaker bar and its mounting structure.

FIG. 9 is an enlarged, fragmentary plan view of a portion of the rotor surface detailing the configuration of the arcuate teeth and the convoluted rib elements.

FIG. 10 is an enlarged, fragmentary sectional view taken through the peripheral portion of the machine rotor in the plane of the line 10—10 in FIG. 9.

FIG. 11 is an enlarged, fragmentary sectional view taken through the peripheral portion of the machine rotor in the plane of the line 11—11 in FIG. 9.

FIG. 12 is a perspective view of an illustrative deboning machine also embodying the invention.

FIGS. 13 and 14 are enlarged, fragmentary elevational views of opposite sides of the machine shown in FIG. 12.

FIG. 13b is a side view of an arcuate tooth.

FIG. 15 is an outer end view of the machine shown in FIGS. 12-14.

FIG. 16 is enlarged, fragmentary sectional view taken transversely through the breaker bar and support of the machine of the plane of the line 16—16 in FIG. 13.

FIG. 17 is an enlarged, fragmentary, plan view of a portion of the rotor surface of the deboning machine shown in FIGS. 12-15.

FIG. 18 is an enlarged, fragmentary sectional view taken through the rotor periphery in the plane of the line 18—18 in FIG. 17.

FIG. 12A is a perspective view of a higher production deboning machine generally similar to the machine shown in FIGS. 12-21 but in the construction of the rotor and the arrangement of pressure/breaker bar.

FIG. 13A is an enlarged, fragmentary sectional view taken transversely of the helical cutting elements of the rotor and the slots of the pressure breaker bar.

FIG. 16A enlarged, fragmentary developed view detailing the tooth layout and structure of the rotor in the machine of FIG. 12A.

FIG. 17A is an enlarged, fragmentary sectional view taken in the plane of the 17A—17A on the machine rotor perpendicular to the rotor axis and showing profiles of the undercut teeth on the rotor.

FIG. 18A is a perspective view of a machine similar to that of FIG. 12 but having a plurality of undercut teeth adjacent the driven end of the rotor and a plurality of non-undercut teeth adjacent the opposite end of the rotor.

FIG. 22 is a side elevational view of another form of illustrative deboning machine also embodying the present invention.

FIG. 23 is an enlarged elevational view taken from the left hand end of the machine shown in FIG. 22.

FIG. 24 is a transverse sectional view through the machine to the same scale as FIG. 23 and taken in a plane corresponding to the line 24—24 in FIG. 25.

FIG. 26 is a plan view of the pressure/breaker bar of the machine shown in FIG. 22 with the adjusting screws shown in exploded form.

FIG. 27 is a front elevational view showing the toothed edge of the pressure breaker bar of FIG. 26.

FIG. 28 is an end view, taken from the left hand end of the pressure/breaker bar of FIG. 26 indicating its relation to the rotor.

FIGS. 29 and 30 are enlarged perspective views looking into the hopper of the machine shown in FIG. 22 illustrating the adjustable wall panel in two different positions.

FIGS. 31 and 32 are face views illustrating both sides of the adjustable wall panel and its clamping means.

FIG. 35 is a side elevational view of another illustrative deboning embodying the present invention.

FIG. 36 an enlarged elevational view taken from the left hand end of machine shown in FIG. 35.

FIG. 37 is a further enlarged horizontal sectional view taken longitudinally through the rotor and pressure bar section of the machine of FIG. 35.

FIG. 38 is a transverse sectional view taken in the plane of the line 38—38 in FIG. 37 but reduced to the scale of FIG. 36.

FIG. 39 is an enlarged plan view showing the main pressure bar of the machine, including the clearance notch for the feed pocket and the decreasing taper on the edge portion cooperating with the rotor.

FIGS. 40A, 40B and 40C are transverse sectional views taken through the main bar in the planes of the lines 40A—40A, 40B—40B and 40C—40C, respectively, in FIG. 39.

FIG. 41 is a plan view of one form of pressure/breaker bar used in the illustrative machine.

FIG. 42 is a front elevational view of the auxiliary pressure bar of FIG. 41 detailing the portion that coacts with the machine rotor.

FIG. 44 is an end view, taken from the left hand end, of the pressure/breaker bar of FIG. 41, indicating its relation to the rotor.

FIGS. 43A and 45A are views of a modified auxiliary pressure bar corresponding generally to the views of FIGS. 42 and 44.

FIG. 46 is a further enlarged fragmentary view taken along the peripheral face of the machine rotor illustrating a portion of the cutting tooth section aligned with the feed pocket and a portion of the portion section which coacts with the main pressure bar.

FIG. 47 is a sectional view taken normal to the rotor axis in the plane of the line 47—47 in FIG. 46.

FIG. 48 is a sectional view taken normal to the rotor axis in the plane of the line 48—48 in FIG. 46.

Figure 5:
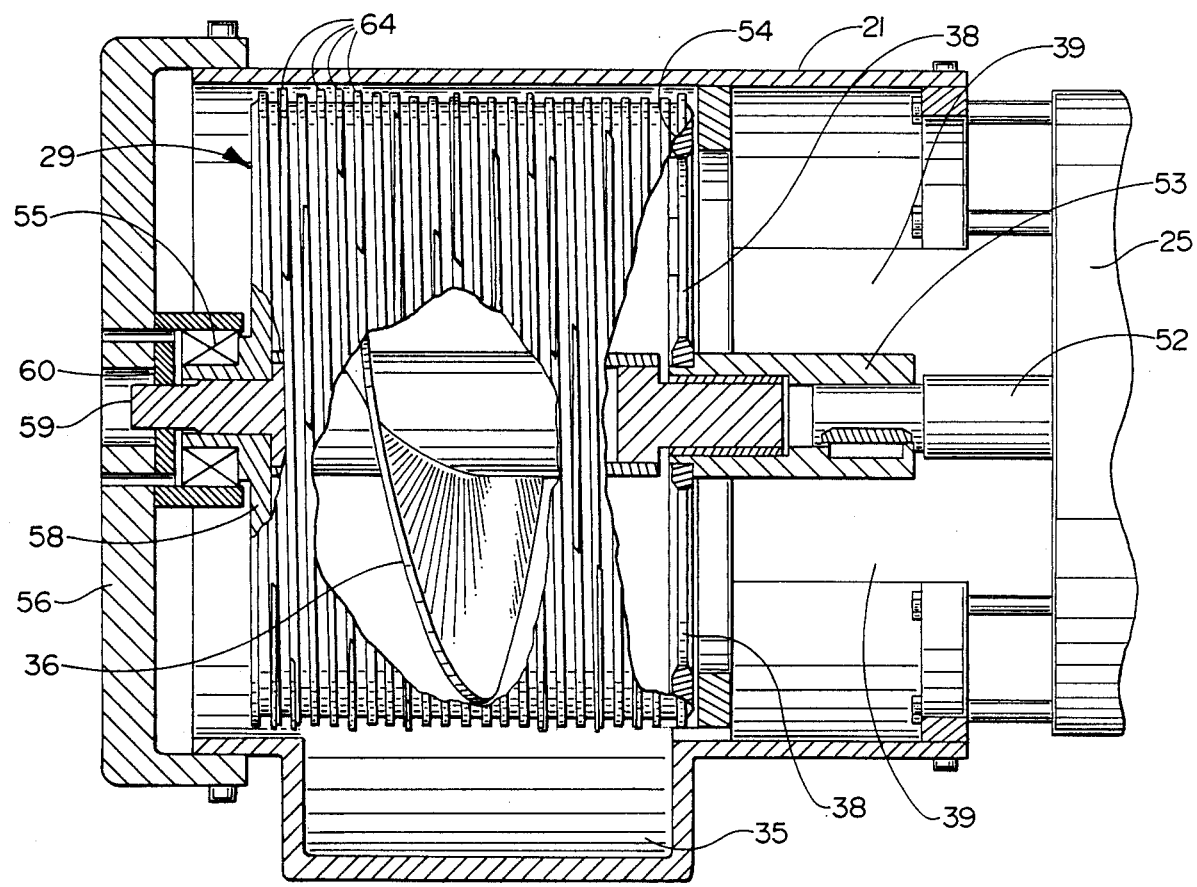
FIG. 5 is a horizontal sectional view through the machine taken in the plane of the line 5—5 in FIG. 4.
Figure 6:
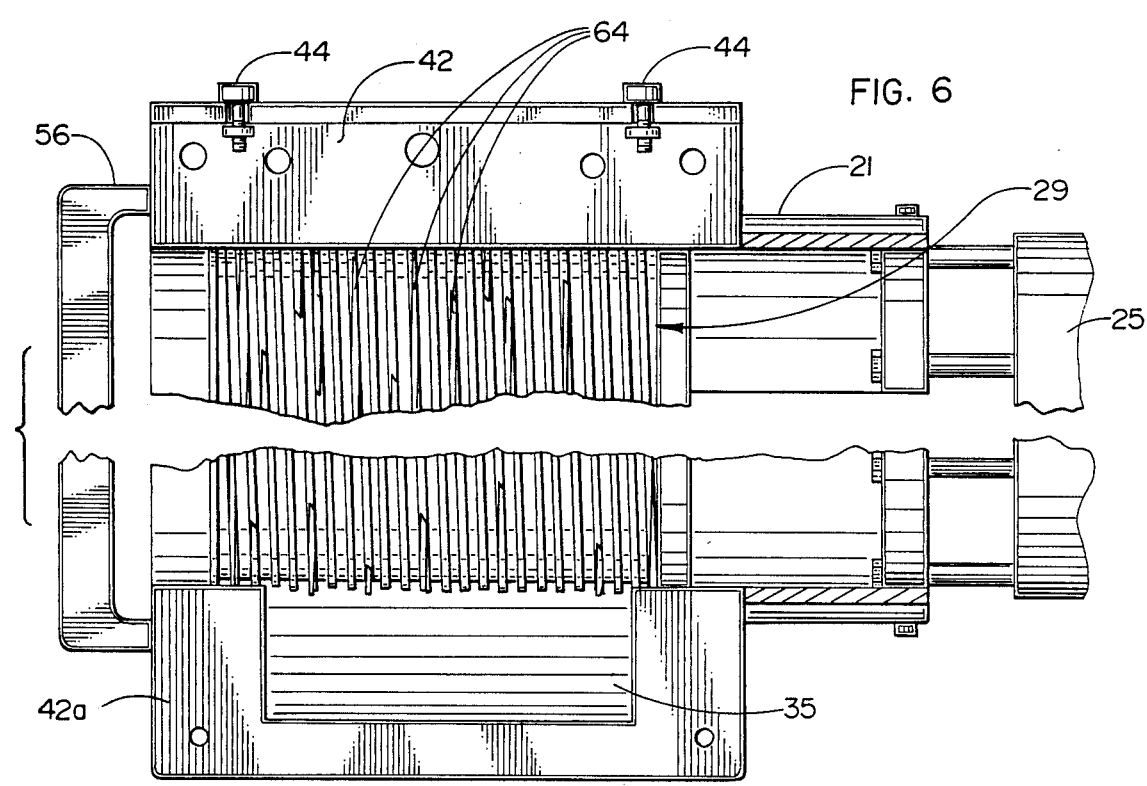
FIG. 6 is a horizontal sectional view similar to FIG. 5 but taken in the plane of the line of 6—6 in FIG. 4.

While the invention is susceptible of various modifications and alternative constructions, certain illustrative embodiments have been shown in the drawings and will be described below in considerable detail. It should be understood, however, that there is no intention to limit the invention to the specific forms disclosed, but, on the contrary, the intention is to cover all modifications, alternative constructions, and equivalents falling within the scope of the appended claims.

DETAILED DESCRIPTION OF THE INVENTION

Referring more specifically to the drawings, the invention is there exemplified in several illustrative mechanical separating machines and a method of separating hard tissue from edible meat. These comprise a desinewing machine, five deboning machines, and a separating method, all as described below.

The Desinewing Machine

FIGS. 1–11 illustrate a single process mechanical desinewing machine 20 exemplifying the present invention. The machine 20 comprises a generally cylindrical casing 21 mounted in cantilever fashion on a drive unit 22. The unit 22 comprises drive motor 24, reduction gear 25, and a connecting frame 26. The machine may, for convenience, be mounted upon a castered supporting frame 28.

The machine casing 21 houses a power driven rotor 29, and a pressure/breaker bar 30 having an arcuate extension 31 cooperating with the rotor 29. It is adapted to process raw material in the form of an agglomeration of red meat containing sinew, cartilage, ligaments and connective tissue from which the large bones have been manually removed. This material is fed directly into a hopper 32 and feed opening 34 in the top wall of the casing. The opening 34 communicates with a relatively large arcuate digesting pocket 35 (FIGS. 5–7) spaced outwardly from the rotor and extending in a general spiral shape therearound for approximately 180 degrees. The radial depth of the pocket 35 decreases in the direction of rotor rotation which is clockwise as viewed in FIGS. 1 and 4.

Upon rotation of the rotor 29, the toothed cutting elements thereof coact with the right hand wall of hopper 32 (as viewed in FIG. 4) and the inner arcuate wall of the pocket 35, and also with the configuration of the pressure/breaker bar 30, to break the raw material into a coarse agglomeration of hard and soft tissues. Edible meat with no perceptible bone is forced by the pressure/breaker bar 30 into the rotor through constricted helical passages in the peripheral wall thereof. Under the guidance of fixed auger 36 within the rotor, the edible comminuted meat exits via discharge apertures 38 in the driven end of the rotor and underlying aperture 39 in the machine casing. This is collected in a meat receptacle 40 as shown in FIG. 2. The by-product or waste material which may consist of hard tissues of bone, sinew, cartilage and stringy connective tissue is trapped on the outer periphery of the rotor and positively driven toward the outboard end thereof where it is discharged and collected in waste receptacle 41, also shown in FIG. 2.

The pressure/breaker bar 30 (FIGS. 4, 7, 8, 11) is mounted on base flange 42 which turns outwardly from the casing wall and ends with an upturned flange 43 along its marginal edge. The base flange 42 locates the pressure/breaker bar 30 so that its bottom face will be somewhat above the horizontal axial plane of the machine rotor. The pressure/breaker bar 30 may be adjusted for proper rotor clearance by means of adjusting screws 44 situated in slots 45 of the upturned flange 43. The adjusting screws are rotatably mounted in their slots 45 but restrained against axial movement by their head and an intermediate flange 46. Since the adjusting screws engage tapped holes in the outer edge of the pressure/breaker bar 30, the latter may be shifted toward or away from the rotor by turning the screws 44 in the proper direction. Upon completion of the adjustment, the pressure/breaker bar 30 is maintained in adjusted position by hold-down bolts 47 which pass through clearance apertures in the bar 30.

Provision is made in the machine 20 for permitting quick and easy disassembly and reassembly thereof for cleaning without disturbing the adjustment of the pressure/breaker bar 30 and the rotor 29. This is accomplished by mounting a pair of locating bolts 48 in slots 49 extending transversely of the base flange 42. The bolts 48 have heads 50 which fit snugly into mating locating holes 51 in the bar 30. The bolts 48 are tensioned sufficiently to retain them in place until they are moved to a new position by the bar 30 through actuation of the adjusting screws 44. By reason of this arrangement, the pressure/breaker bar 30 may be removed for cleaning and quickly reassembled in its original adjusted position.

The hopper 32 may likewise be quickly disassembled for cleaning and promptly reassembled by removing and replacing only three hold-down bolts 47. The base of the hopper is accordingly attached to an arcuate cover plate 32a having a first flange 33 overlying the pressure/breaker bar 30 and a second flange 33a overlying a base flange 42a on the casing 21. The hopper and its flanges 33, 33a are secured in place by the hold-down bolts 47.

The rotor 29 (FIGS. 1,4–7, 9–11) is driven from the output shaft 52 of reduction gear 25 and supported at its inboard end by hub 54 and end plate 55, the latter including the meat discharge apertures 38. At its outboard end, the rotor 29 is journaled in a main support bearing 56a mounted on a diametrical bracket 56 which extends across the end of the casing (FIGS. 1, 4, 5, 7). The outer end of the rotor is closed by end cap 58 centered in the bearing 55a. The end cap maintains a running clearance with the projecting outboard end 59 of the fixed auger 36 which is held against rotation by means of a fixed socket plate 60.

As indicated above, the rotor 29 is formed with a plurality of helical cutting elements 61, 62 disposed in axially spaced relation on its periphery and generally similar to, but specifically different from those disclosed in my prior patent Nos. 3,659,638 and 4,018,389. The elements 61 are of generally rectangular cross-section and are greater in diameter, in this instance by 0.250 inch, than the elements 62 which are of generally Y-shaped cross-section.

In accordance with the invention, provision is made in the desinewing machine 20 for directly accepting raw material in the form of an agglomeration of red meat, sinew, cartilage, ligaments and connective tissue from which the large bones have been manually removed. This material is fed directly into the hopper 32, feed opening 34 in the casing, and the digesting pocket 35 of the desinewing machine 20 without first being subjected to a coarse grinding step outside the machine. This is accomplished in the present instance by constructing the rotor 29 and the pressure/breaker bar 30 with a plurality of interdigitated sets of teeth disposed in closely spaced relation with each other.

The toothed area of the rotor 29 extends for substantially its full length and for substantially the full length of the arcuate pocket 35. The teeth of the rotor 29 are of arcuate configuration and defined in the set of helical cutting elements 61 which have a rectangular cross section (FIGS. 5–7, 9–11). Although the elements 61 have a slight pitch which may be 0.200 inch per revolution, arcuate teeth 64 are formed therein lying in a plane substantially perpendicular to the rotational axis of the rotor 29. The term "substantially perpendicular", as used herein, means that one face of the tooth follows the pitch of the helical cutting element on which it is formed, while the other face of the tooth lies in a plane perpendicular to the rotational axis of the rotor. The teeth may, for example, have an approximate height of 0.25 inch, a thickness varying from 0.055 inch to 0.080 inch, and an arcuate length varying from a few degrees to 240 degrees.

To accommodate the large volume of product processed by the desinewing machine 20, the constricted spaces between the helical cutting elements 61, 62 decrease from the inboard end of the rotor 29 toward the outboard end. Thus the inboard one third of the rotor will have clearance spaces between the elements 61, 62 ranging from 0.027–0.029 inch; the middle third of the rotor will have clearance spaces ranging from 0.023–0.025 inch; and the outboard third of the rotor will have clearance spaces between the elements 61, 62 ranging from 0.019–0.021 inch.

The toothed area of the pressure/breaker bar 30 (FIGS. 7, 8, 11) extends for substantially the full length of the rotor 29. It also includes an arcuate portion 31 overlying the rotor and extending in the direction of rotor movement. The inner face portion of the bar 30 which cooperates with the rotor 29 has a plurality of angular teeth 65 alternating with corresponding grooves 66. These teeth and grooves extend from the bottom face of the bar 30 to the end of the extension 31. In the present instance, the teeth of the bar 30 happen to be on the order of 0.250 inch in width and the grooves between them are on the order of 0.136 inch in width. The depth of the teeth of pressure/breaker bar 30 may be on the order of 0.260–0.270 inch, the bar 30 being adjusted by screws 44 to allow approximately 0.003–0.005 inch clearance between the Y-shaped helical cutting elements and the rotor. The angle of the tooth faces on the bar 30 may be on the order of 56 degrees from the horizontal, defining with the rotor a wedge shaped pressure pocket P extending in the direction of rotation of the rotor face for engaging material on the surface thereof. In this instance, the angle of the tooth faces and the angle of the intervening grooves on the bar 30 are the same. The teeth 65 run for substantially the full thickness of the pressure/breaker bar, and may have a slight chamfer at the bottom. This tends to lengthen the pressure pocket and permit engagement of more material than would be the case with a shorter pressure pocket.

The outer peripheral surfaces of the rotor teeth 64 may have several different configurations. These include a bevel on one side or the other, a double bevel with a ridge in the center, or a flat top such as shown in FIGS. 7A and 11. The teeth 64 may also be arranged in clusters with open areas therebetween to increase the amount of raw material being processed by the machine 20. The squeezing, cutting, and waste ejecting action on the raw material being processed in the machine is diagrammatically shown in FIG. 7A. Such action is effected by the interaction of the rotor teeth 64, the cooperating teeth and grooves 65, 66 of the pressure/breaker bar, and the helical cutting elements 61, 62 of the rotor.

The performance of a desinewing machine such as the machine 20 is indicated by the following parameters:

| | |
|---|---|
| Rotor diameter | 13 inches |
| Rotor length | 9 inches |
| Rotor speed | 125 RPM |
| | 400–450 Ft. per min. |
| Horsepower under load | 20 |
| Pounds of edible meat per hour | 1,000–1,500 |
| Percent of edible meat recovered from raw material | 75–90 |

First Deboning Machine

FIGS. 12–21 illustrate a high capacity single process deboning machine 120 which also exemplifies the invention. The machine 120 has a configuration generally similar to that of the desinewing machine 20 but utilizes a more powerful drive unit and larger capacity rotor and casing.

Turning first to FIGS. 12–15, it will be noted that the machine 120 comprises a generally cylindrical casing 121 mounted in cantilever fashion on drive unit 122. The latter includes drive motor 124, reduction gear 125, and a connecting frame 126. The machine may be mounted upon a castered supporting frame 128.

The machine casing 121 houses a power driven rotor 129 and a cooperating pressure/breaker bar 130. Unground raw material in the form of whole poultry or fish carcasses, shellfish, or bone-in cuts of beef, pork or lamb, is fed directly into hopper 132 and feed opening 134 in the top wall of the casing. The opening 134 communicates with a large arcuate digesting pocket 135 spaced outwardly from the rotor and extending generally spirally therearound for approximately 180 degrees. The radial depth of the pocket 135 decreases in the direction of rotor rotation which is clockwise as viewed in FIGS. 12 and 15.

Upon rotation of the rotor 129, the toothed cutting elements thereof coact with the right hand wall of hopper 132 and the inner arcuate wall of the pocket 135, and with the pressure/breaker bar 130, to break the raw material into a coarse agglomeration of hard and soft tissues. Edible meat with no perceptible bone is forced by the pressure/breaker bar 130 into the rotor through constricted helical grooves in the peripheral wall thereof. Under the guidance of a fixed auger 136 within the rotor, the edible comminuted meat exits via discharge apertures 138 in the driven end of the rotor and underlying aperture 139 in the machine casing. It is collected in a meat receptacle 140 as shown in FIG. 13. The by-product or waste material which may consist of hard tissues of bone, sinew, cartilage and stringy connective tissue is trapped on the outer periphery of the rotor and positively driven toward the outboard end thereof where it is discharged and collected in waste receptacle 141, also shown in FIG. 13.

The pressure/breaker bar 130 (FIGS. 12, 15, 16, 21) is mounted on base flange 42 which, like the base flange 142a, turns outwardly from the casing wall. The base flange 142 locates the pressure/breaker bar 130 so that its bottom face is substantially above the horizontal axial plane of the rotor 129. The pressure/breaker bar 130 may be adjusted for proper rotor clearance by means of adjusting screws 144 in upturned flange 143. It may be secured in adjusted position by hold-down bolts 147 in a manner similar to that used in the machine 20 and shown in FIG. 16. The pressure/breaker bar 130 may be quickly and easily disassembled for cleaning and reassembled without disturbing its adjustment. This is accomplished by means of the locating bolts 148 frictionally secured in slots 149 in the base flange. The heads 150 of these bolts register closely with holes in the bar 130 and move as the bar is adjusted. Upon removal and reassembly of the bar 130, the heads precisely define its adjusted position (FIG. 16).

The hopper 132 and its arcuate cover plate 131 may also be quickly disassembled and reassembled for cleaning. On one side of the casing, the cover plate overlies the pressure/breaker bar 130 and its base flange 142. On the other side, it overlies the opposite base flange. The hopper may be secured in place by means of four hold-down bolts 147 (FIGS. 12–15).

Figure 19:
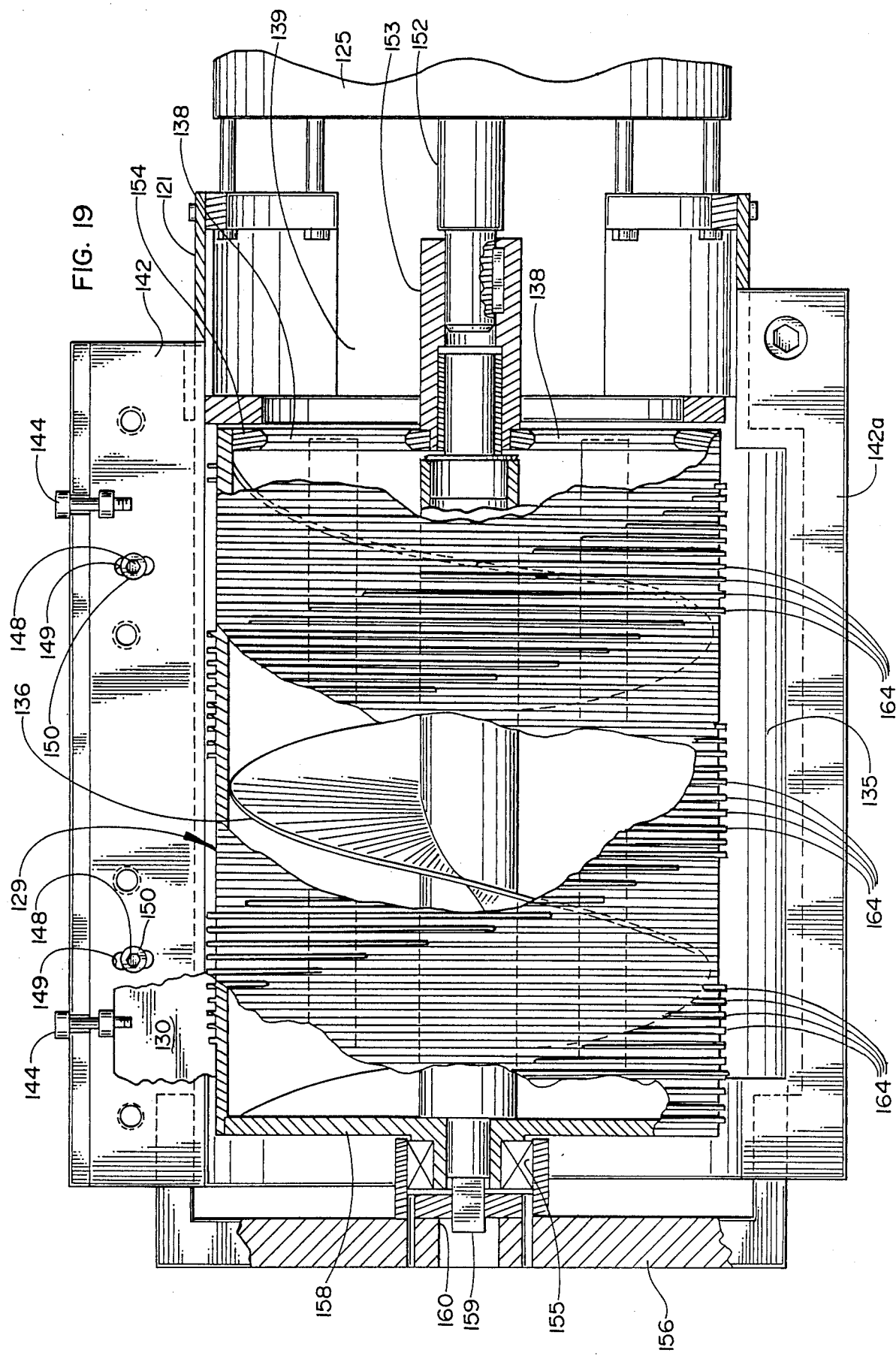
FIG. 19 is an enlarged horizontal sectional view through the machine of FIG. 12 taken in the plane of the line 19—19 in FIG. 15.
Figure 20:
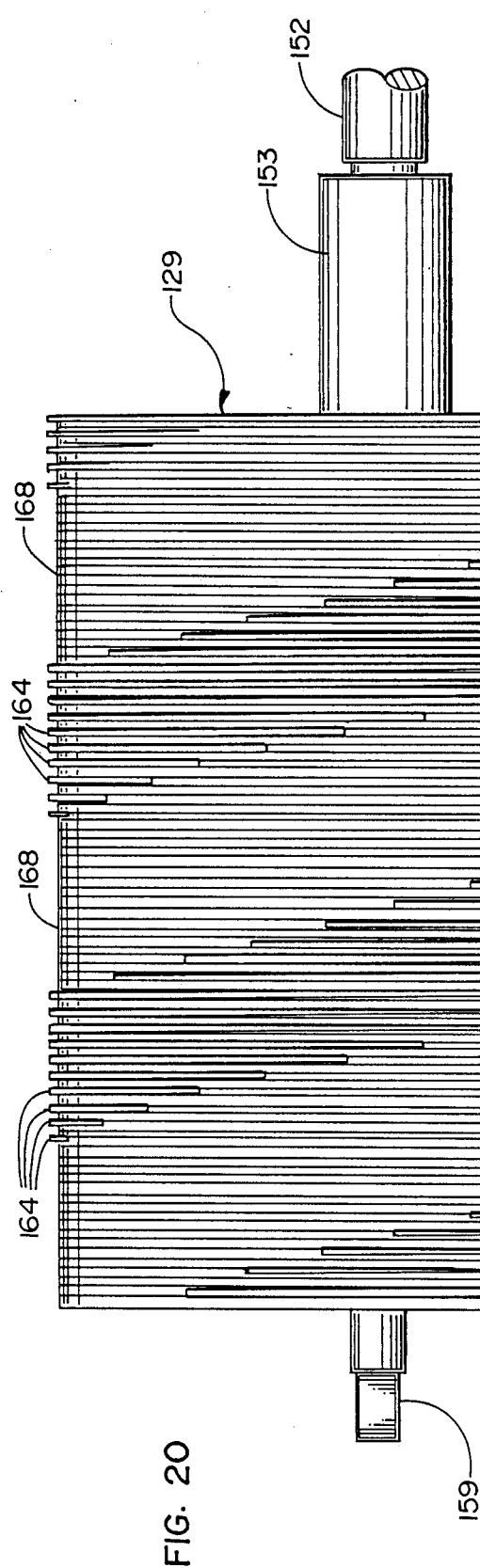
FIG. 20 is an enlarged plan view of the peripheral surface of the rotor shown in FIG. 19.

As shown in FIG. 19, the rotor 129 is journaled in the machine casing 121 and power driven from the output shaft 152 of reduction gear 125. The inboard end of the rotor is supported by means of hub 153 and end plate 154, the latter including the meat discharge apertures 138. At its outboard end, the rotor 129 is journaled in a main support bearing 155 mounted on a diametrical bracket 156 which extends across the end of the casing (FIGS. 12–15, 19). The outer end of the rotor is closed by end cap 158 centered in the bearing 55. The end cap maintains a running clearance with the projecting outboard end 159 of the fixed auger 136 which is held against rotation by means of a fixed socket plate 160.

As in the case of the desinewing machine 20, supra, the rotor 129 of the deboning machine 120 is formed with a plurality of helical cutting elements 161, 162 disposed in axially spaced relation on its periphery and generally similar to, but specifically different from those disclosed in my prior patent Nos 3,659,638 and 4,018,389. The elements 161 are of generally rectangular cross-section and are greater in diameter, in this instance by 0.250 inch, than the elements 162 which are of generally Y-shaped cross-section.

In accordance with the invention, provision is made in the deboning machine 120 for feeding directly into the hopper 132, feed opening 134, and digesting pocket 135, unground raw material in the form of whole poultry or fish carcasses, fish skeletals, or bone-in cuts of beef, pork or lamb. In the present instance, this is accomplished by fashioning the rotor 129 and the pressure/breaker bar 130 with interdigitated sets of teeth disposed in closely spaced relation with each other.

Figure 21:
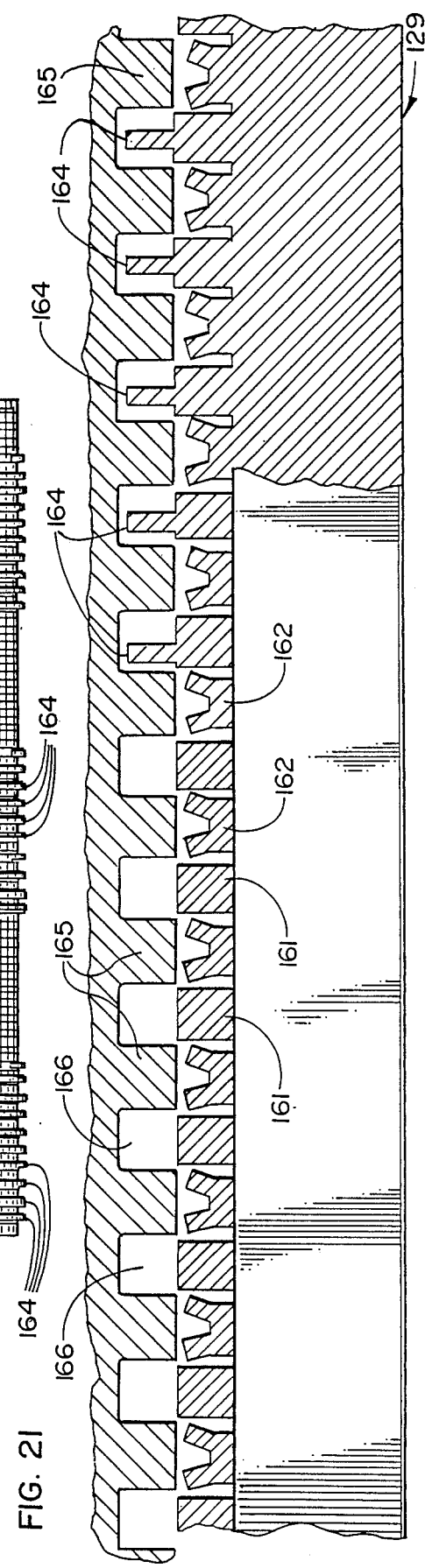
FIG. 21 is a further enlarged, fragmentary view detailing the interdigital relation between the breaker bar and the rotor in the machine of FIG. 12.

The toothed area of the rotor 129 extends for substantially its full length and the full length of the arcuate digesting pocket 135. The teeth of the rotor 129 are of arcuate configuration and defined in the set of helical cutting elements 161 which have a rectangular cross-section (FIGS. 5–7, 9–11). Although the elements 161 have a pitch which may be 0.200 inch per revolution, arcuate teeth 164 are formed in the elements 161 lying in a plane substantially perpendicular to the rotational axis of the rotor 129 as explained above. The teeth 164 may, for example, have an approximate height of 0.25 inch, a thickness varying from 0.055 inch to 0.080 inch, and an arcuate length varying from a few degrees to 240 degrees. The outer peripheral surfaces of the teeth 164 may be beveled toward one side or the other, or have a double bevel with a central ridge, or a flat top as shown in FIG. 21. The grooves separating the cutting elements 161, 162 at the outer peripheral surface of the rotor may be approximately 0.008–0.010 inches in width for meats such as beef, pork, lamb, chicken, turkey and fish. For crab, lobster, and shrimp, these grooves may be approximately 0.006–0.0008 inches in width. At their inner ends, all such grooves open out to approximately 0.020 inches in width.

The toothed area of the pressure/breaker bar 130 (FIGS. 19, 21) extends for substantially the full length of the rotor 129. The inner face portion of the bar 130 which cooperates with the rotor 129 has a plurality of angular teeth 165 alternating with corresponding grooves 166. These teeth and grooves are parallel and lie in planes perpendicular to the rotational axis of the rotor. They extend from the bottom face of the bar 130 to the top face of the latter. In the present instance, the teeth of the bar 130 happen to be on the order of 0.250 inch in width and the grooves between them are on the order of 0.136 inch in width. The depth of the teeth of pressure/breaker bar 130 may be on the order of 0.260–0.270 inch, the bar 130 being adjusted by screws 144 to allow approximately 0.003–0.005 inch clearance between the Y-shaped helical cutting elements and the rotor. The angle of the tooth faces on the bar 130 may be on the order of 56 degrees from the horizontal, defining with the rotor a wedge shaped pressure pocket P extending in the direction of rotation of the rotor for engaging material on the surface thereof. In this instance, the angle of the tooth faces and the angle of the intervening grooves on the bar 130 are the same. The teeth 165 run for substantially the full thickness of the pressure/breaker bar and may have a slight chamfer at the bottom. This tends to lengthen the pressure pocket and permit engagement of more material than would be the case with a shorter pressure pocket.

In order to increase the amount of raw material processed by the machine 120, the arcuate teeth 164 on the rotor 129 may be grouped in helical bands with untoothed areas 168 of helical shape interposed between the bands of teeth. The areas 168 still include the helical cutting elements 161, 162 with narrow separating grooves on the order of 0.008 inch therebetween but the elements 161 and 162 are both of approximately the same radial height.

The squeezing, cutting, and waste ejecting action on the raw material being processed in the machine is diagrammatically shown in FIG. 7A 1 supra. Such action is effected by the interaction of the rotor teeth 164, the cooperating teeth and grooves 165, 166 of the pressure/breaker bar, and the helical cutting elements 161, 162 of the rotor.

The performance of a deboning machine such as the machine 120 is indicated by the following parameters:

| | |
|---|---|
| Rotor diameter | 13 inches |
| Rotor length | 18 inches |
| Rotor speed | 125 RPM |
| | 400–450 Ft. per min. |
| Horsepower under load | 20–40 |
| Pounds of edible meat per hour | 3,000 |
| Percent of edible meat recovered from raw material | 79–89 |

Modifications of First Deboning Machine

Turning next to FIGS. 12A–18A, two modifications 120A and 120B of the first deboning machine 120 are there shown exemplifying the present invention. Parts common to the machines 120A, 120B and the machine 120 will be referred to by the same reference numerals. Parts not common to machines 120A and 120B will be referred to by separate reference numerals.

The deboning machine 120A is generally similar in construction to the machine 120 but has a somewhat shorter rotor 129A and casing 121. It includes a substantially identical drive motor 124, reduction gear 125, and connecting frame 126. The upper shell of the casing 121, including the hopper, has been omitted in order to show the power driven toothed rotor 129A, the arcuate digester pocket 135, and the toothed pressure/breaker bar 130. The rotor has helical cutting elements similar to those of the machine 120 except for the configuration of the upstanding arcuate teeth. A fixed auger 136 is housed within the rotor to facilitate discharge of edible meat via apertures 138 and held against rotation by diametrical bracket 156 which also carries outboard support bearing 155 of the rotor. The outer end of the rotor is closed by end cap 158 centered in bearing 155.

Figure 14A:
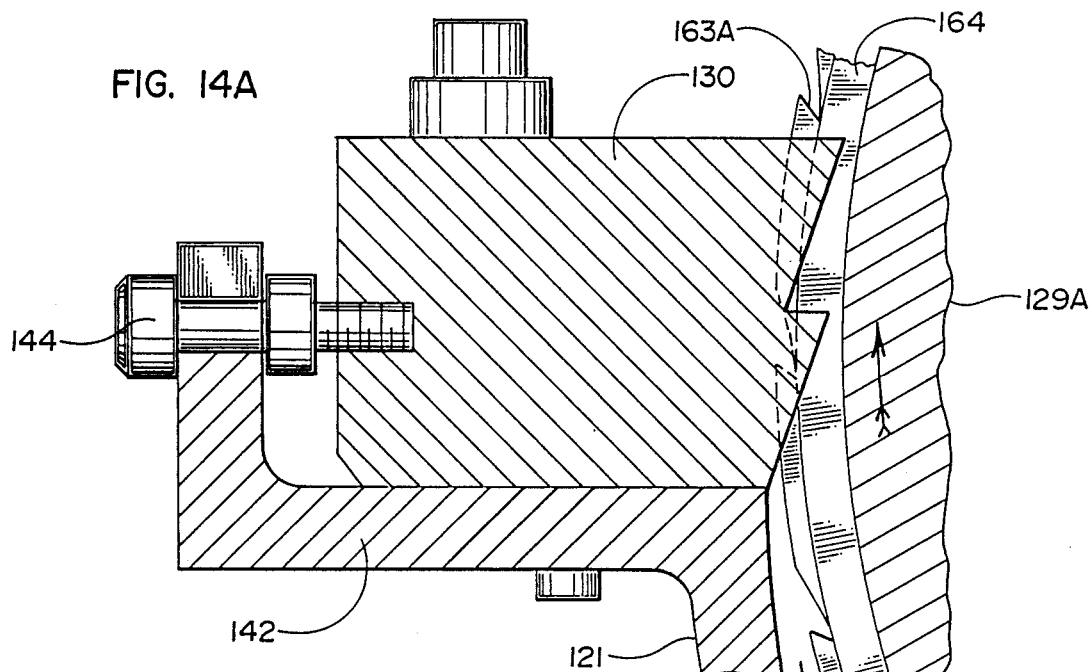
FIG. 14A is a transverse sectional view through the pressure/breaker bar, its support, and the adjacent portion of the toothed rotor.
Figure 15A:
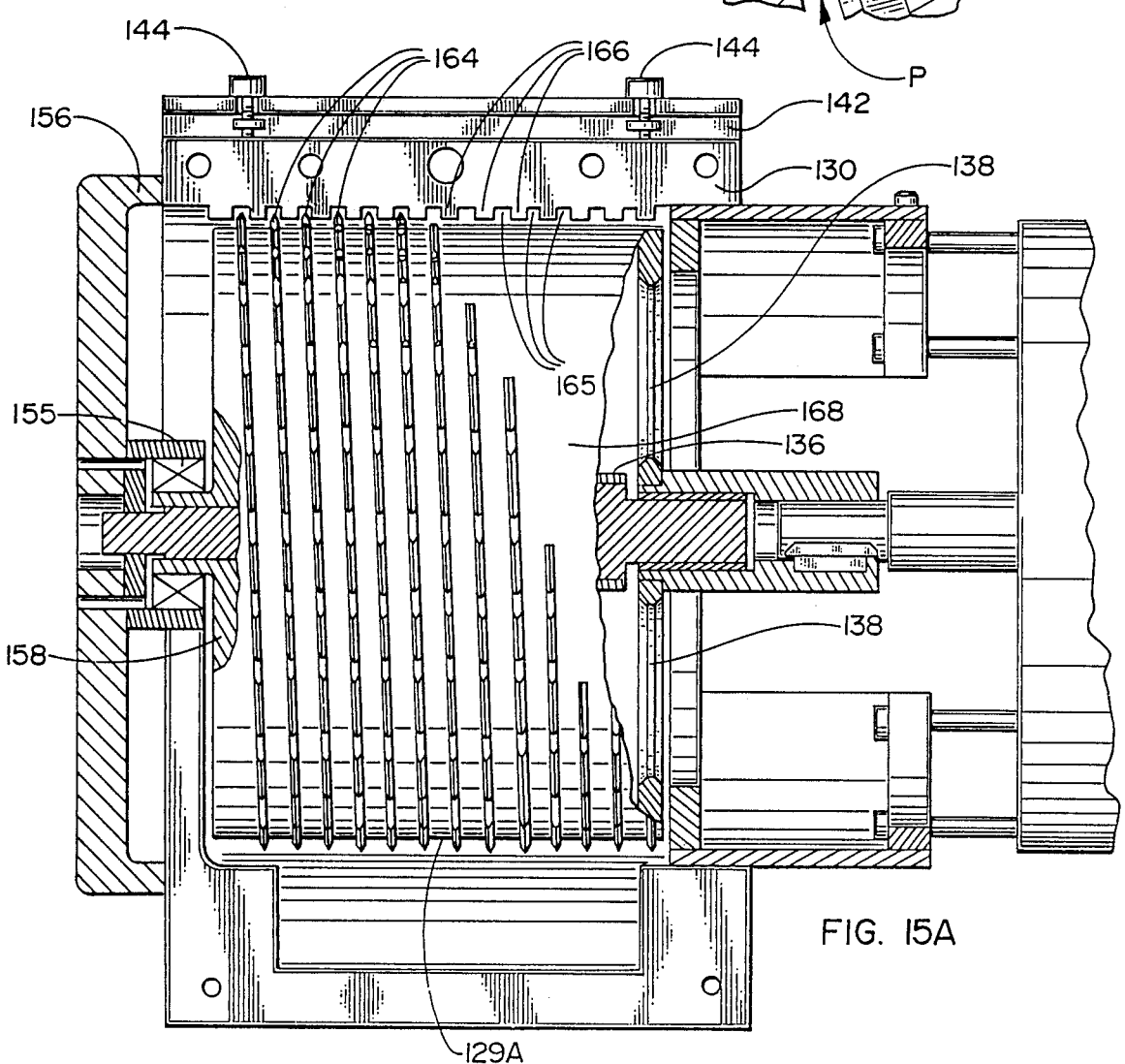
FIG. 15A is a plan view detailing the peripheral structure of the rotor, the pressure/breaker bar, and the surrounding portion of the shown in FIG. 12A.

The breaker bar 130 is formed in this instance with a double taper, one superimposed above the other, and each making an angle of 70° with a horizontal plane passing through the bar 130. The tapered side of the bar 130 facing the rotor is bolted to a base flange 142 projecting outwardly from the casing 121 (FIGS. 14A, 15A). The location of the breaker bar 130 and flange 142 is such that the axis of the rotor 129A lies approximately in the horizontal medial plane of the bar 130. The breaker bar may be adjusted for clearance of 0.003–0.005 inch with the rotor by means of adjusting screws 144 in upturned edge portion of base flange 142.

In keeping with the present invention, the machine 120A is adopted to accept raw material in the form of bone-in cuts of beef, pork or lamb, as well as whole poultry, chicken necks and backs, chicken frames, fish carcasses, fish skeletals, crab and lobster. It is further adapted to separate such raw material into boneless comminuted edible meat, on the one hand, and non-edible waste material, on the other. This is accomplished by forming the rotor 129A and the pressure/breaker bar 130 with interdigitated sets of teeth in closely spaced relation with each other, defining a wedge shaped pressure pocket P extending in the direction of rotation of the rotor.

The toothed area of the rotor 129A extends for substantially its full length. It comprises a series of relatively long, upstanding arcuate teeth 164 staggered with respect to each other around the peripheral surface of the rotor 129A. The teeth 164 are defined in the set of helical cutting elements 161 which have a rectangular cross-section. Although the elements 161 have a pitch which may be 0.250 inch per revolution, the upstanding arcuate teeth 164 are formed on the elements 161 lying in a plane substantially perpendicular to the rotational axis of the rotor 129. As explained earlier above, one face FP of each arcuate tooth lies in a plane perpendicular to the rotational axis of the rotor, while the opposite face FT tapers slightly in accordance with the slight pitch (0.250 inch per revolution) of the helical cutting element on which it is formed. The teeth 164 of rotor 129A may, for example, have an approximate height of 0.400 inch, a thickness varying from 0.130 to 0.070 inch, and an arcuate length on the order of 240 degrees. The leading edge 164A of each tooth 164 is sloped rearwardly at an angle of 50 degrees to prevent damage due to impacts with hard material.

The outer peripheral surfaces of the teeth 164 may be beveled toward one side or the other, or have a double bevel with a central ridge, or a flat top as shown in FIG. 21. The grooves separating the cutting elements 161, 162 at the outer peripheral surface of the rotor may be approximately 0.008–0.010 inches in width for meats such as beef, pork, lamb, chicken, turkey and fish. For crab, lobster, and shrimp, these grooves may be approximately 0.004–0.006 inch in width. At their inner ends, all such grooves open out to approximately 0.020 inch in width.

In accordance with a further aspect of the invention, provision is made for processing bone-in cuts of beef, pork or lamb at substantially higher-production rates than previously attainable with machines of the type known heretofore. This is accomplished in the present instance by fashioning each arcuate tooth 164 of rotor 129A with a series of longitudinally spaced undercut teeth 163A extending transversely across its outer peripheral portion. As shown in FIGS. 12A, 15A–17A, the undercut teeth 163A are disposed in evenly spaced relation along each arcuate tooth 164 and in the present instance are spaced at 6 degree intervals. The teeth 163A may be spaced at greater or closer intervals, depending upon the nature of the product to be processed. The teeth 163A may be aligned axially of the rotor as shown in the drawings but they could also be staggered if desired. Exemplary dimensions of the teeth 163A are 0.400 inch spacing between teeth, an undercut leading edge of 0.150 inch on the tooth and an inclined ramp defined by an included angle of approximately 58 to 60 degrees.

The toothed area of the pressure/breaker bar 130 (FIGS. 12A, 15A) extends for substantially the full length of the rotor 129A. The inner face portion of the bar 130 which cooperates with the rotor 129A has a plurality of angular teeth 165 alternating with corresponding grooves 166. These teeth and grooves are parallel and lie in planes perpendicular to the rotational axis of the rotor. They extend from the bottom face of the bar 130 to the top face of the latter. In the present instance, the teeth of the bar 130 happen to be on the order of 0.350 inch in width and the grooves between them are on the order of 0.160 inch in width. The depth of the teeth of pressure/breaker bar 130 may be on the order of 0.330–0.350 inch, the bar 130 being adjusted by screws 144 to allow approximately 0.003–0.005 inch clearance between the bar 130 and the Y-shaped helical cutting elements on the rotor. The teeth 165 run for substantially the full thickness of the pressure/breaker bar and may have a slight chamfer at the bottom which tends to lengthen the pressure pocket and permit engagement of more material than would be the case with a shorter pressure pocket.

In order to increase the amount of raw material processed by the machine 120A, the arcuate teeth 164 on the rotor 129A may be grouped in helical bands with untoothed areas 168 of helical shape interposed between the bands of teeth. The areas 168 still include the helical cutting elements 161, 162 with narrow separating grooves on the order of 0.006–0.008 inch therebetween but the elements 161 and 162 are both of approximately the same radial height in the areas 168.

A small deboning machine with the configuration of the machine 120A described above may be expected to perform as follows:

| | |
|---|---|
| Rotor diameter | 7.75 inches |
| Rotor length | 5.75 inches |
| Rotor speed | 230 RPM |
| | 500 Ft. per min. |
| Horsepower under load | 5–15 |
| Pounds of edible meat per hour | 100–300 |
| Percent of edible meat recovered from raw material | 25–80 |

A larger version of the machine 120A with a rotor diameter of approximately 13 inches and a rotor length of 18 inches would substantially exceed the performance of the machine 120 as well as the machine 120A.

Referring now to FIG. 18A, modification 120B of the first deboning machine 120 is there shown which also exemplifies the present invention. The hopper 132 and upper shell 121 of the casing have been removed in order to show the structure of rotor 129B more clearly. The machine 120B is somewhat closer in size and structure to the machine 120 than to the machine 120A, the principal difference being in the configuration of the rotor 129B.

The inboard end portion of the rotor 129B is formed with a plurality of laterally spaced, staggered arcuate teeth 164 each having a length on the order of 240 degrees. Each arcuate tooth 164 has a series of longitudinally spaced undercut teeth 163A extending across its outer peripheral portion. The teeth 164 and 163A are substantially identical in structure to those on rotor 129A of deboning machine 120A described earlier herein and function in the same manner. The remainder of the area on the rotor 129B comprises a staggered series of plain arcuate teeth 164 and a helically shaped clear area 168 devoid of teeth but having the helical cutting elements 161, 162 with narrow separating grooves between such elements communicating with the interior of the rotor. The performance of the machine 120B is significantly better than that of the machine 120 set forth above.

Second Deboning Machine

FIGS. 22–32 show a modified form of mechanical deboning machine 220 also exemplifying the present invention. The machine 220 comprises a generally cylindrical casing 221 cantilevered outwardly from a drive unit 222 which includes a drive motor 224, reduction gear 225, and a connecting frame 226. A power driven rotor 229 is detachably connected to the output shaft of the reduction gear 225. The machine may be mounted upon any suitable support such as the castered frame 228.

The machine casing houses the power driven rotor 229 and cooperating pressure/breaker bar 231. Raw material in the form of whole poultry or fish carcasses, shellfish, or bone-in cuts of beef, pork or lamb, is fed directly into a hopper 232 and feed opening 234 in the top wall of the casing. The opening 234 communicates with a relatively large arcuate digesting pocket 235 spaced outwardly from the rotor and extending generally spirally therearound for approximately 180 degrees. The radial depth of the pocket 235 decreases in the direction of rotor rotation which is clockwise as viewed in FIGS. 23 and 24.

Upon rotation of the rotor 229, the toothed cutting elements thereof coact with the right hand wall of hopper 232 and the arcuate wall of the pocket 235, and also with the configuration of the pressure/breaker bar 231, to break the raw material into a coarse agglomeration of hard and soft tissues. Edible meat with no perceptible bone is forced by the pressure/breaker bar 231 into the rotor through constricted helical grooves in the peripheral wall thereof. Under the guidance of fixed auger 236 within the rotor, the edible comminuted meat exits via discharge apertures 238 in the driven end of the rotor and underlying aperture 239 in the machine casing. This is collected in a meat receptacle 240 as shown in FIG. 22. The by-product or waste material which may consist of hard tissues of bone, sinew, cartilage and stringy connective tissue is trapped on the outer periphery of the rotor and positively driven toward the outboard end thereof where it is discharged and collected in waste receptacle 241, also shown in FIG. 22.

The pressure/breaker bar 231 (FIGS. 22–28) is mounted on base flange 243 which turns outwardly from the casing wall and ends with an upturned flange 244 along its marginal edge. The base flange 243 locates the pressure/breaker bar 231 so that its medial plane will be in or near coincidence with the horizontal axial plane of the machine rotor. The pressure/breaker bar 231 may be adjusted for a rotor clearance of 0.004–0.006 inch by means of adjusting screws 245 carried by the upturned flange 244 on the base flange 243. The pressure/breaker bar 231 is maintained in adjusted position by hold-down bolts 246 which pass through clearance apertures in the bar 231.

Figure 25:
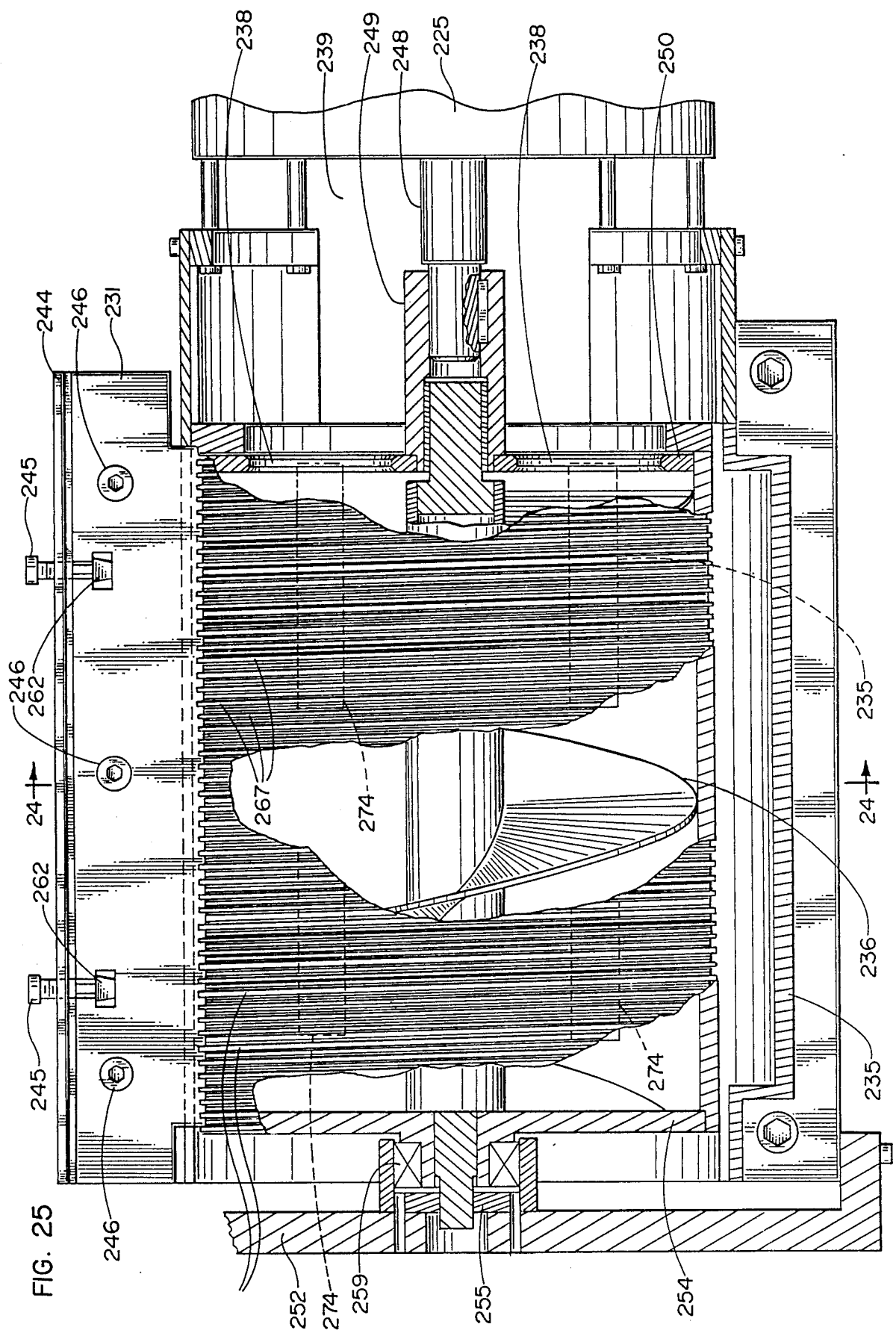
FIG. 25 is a further enlarged horizontal sectional view taken longitudinally the rotor, pressure/breaker bar and digester pocket section of the machine of FIG. 22.

The rotor 229 (FIGS. 22–25) is driven from the output shaft 248 of reduction gear 225 and supported at its inboard end by hub 249 and end plate 250, the latter including the meat discharge apertures 238. At its outboard end, the rotor 229 is journaled in a main support bearing 251 mounted on a diametrical bracket 252 which extends across the end of the casing (FIGS. 23, 25). The outer end of the rotor is closed by end cap 253 centered in the bearing 251. The end cap maintains a running clearance with the projecting outboard end 254 of the fixed auger 236 which is held against rotation by means of a fixed socket plate 255.

As indicated above, the rotor 229 is formed with a plurality of helical cutting elements 256, 258 disposed in axially spaced relation on its periphery and generally similar to those disclosed in my prior patent Nos. 3,659,638 and 4,018,389. The elements 256 are of generally rectangular cross-section and are of somewhat greater diameter than the elements 258 which are of generally Y-shaped cross-section. The grooves separating the cutting elements 256, 258 at the outer peripheral surface may be approximately 0.008–0.010 inch in width. At their inner ends, these grooves open out to approximately 0.020 inch in width. The distance between adjacent ones of the helical cutting elements 256, 258 may be on the order of 0.136 inch. The radial difference between the radial extremities of the Y-shaped cutting elements 258 and the radial extremities of the rectangular cross-section cutting elements 256 may be on the order of 0.060-0.070 inch. The constricted grooves between the cutting elements 256, 258 communicate between the interior of the rotor and the pressure pocket or pockets defined by the radial extremities of the cutting elements 256, 258 and the pressure/breaker bar 231.

In accordance with the invention, provision is made in the machine 220 for directly accepting raw material in the form of whole poultry or fish carcasses, shellfish, or bone-in cuts of beef, pork or lamb, without first subjecting such material to a separate coarse griding step outside the deboning machine. This is accomplished in the present instance by constructing the rotor 229 and the pressure/breaker bar 231 in the region of the arcuate digesting pocket 235 with a plurality of interdigitated sets of teeth. The latter are disposed in close clearance with each other such, for example, as 0.002 inch.

The teeth on the rotor 229 are generally rhomboidal in shape. They are defined by two sets of intersecting grooves 268, 269 which cut through the helical cutting elements of rectangular cross-section 256 above the extremities of the helical cutting elements 258 of Y-shaped cross-section, as shown in FIG. 18A. One set of these grooves 268 is defined as a high pitch spiral. The other set 269 is defined by a series of parallel cuts in planes perpendicular to the rotor axis. The depth of such grooves may be on the order of 0.060-0.090 inch. The toothed area of the rotor 229, extends for substantially its full length and for substantially the full length of the arcuate pocket 235.

The toothed area of the pressure/breaker bar 231 (FIGS. 25-28) extends for substantially the full length of the rotor 229. The inner edge portion of the bar 231 which cooperates with the rotor 229 has a plurality of angular teeth 259 alternating with corresponding grooves 260. In the present instance, the teeth of the bar 231 happen to be on the order of 0.136 inch in width and the grooves between them are also on the order of 0.136 inch in width. The depth of the teeth of pressure/breaker bar 231 may be on the order of 0.085-0.100 inch, the bar being adjusted by screws 245 to allow approximately 0.004-0.006 inch clearance with the rotor. The angle of the tooth faces on the bar 231 may be on the order of 30 to 60 degrees from the vertical, defining an angular pressure pocket extending in the direction of rotation of the rotor face for engaging material on the surface thereof. In this instance, the angle of the tooth faces and the angle of the intervening grooves on the bar 231 is the same. The teeth 259 run for substantially the full thickness of the pressure/breaker bar, with a slight chamfer at the bottom. This tends to lengthen the pressure pocket and permit engagement of more material than would be the case with a shorter pressure pocket.

To facilitate adjustment of the pressure/breaker bar 231 with respect to the rotor 229, the bar 231 has a pair of T-slots 261 extending vertically therethrough. The T-slots are engaged respectively by the enlarged inner heads 262 of the adjusting screws. The inner heads 262 have a relatively close fit with the front and rear walls of the T-slots, but substantial clearance with the lateral sidewalls of the T-slots. This permits precise adjustment of the pressure/breaker bar both radially and longitudinally of the rotor 229. Such adjustment is facilitated by forming the clearance holes 264 in the bar 231 with a diameter sufficiently larger than that of the hold-down bolts 246 to permit the necessary adjusting movement.

In order to avoid a build-up of raw material on the peripheral surface of the rotor 229, one or more relief areas 274 may be defined thereon (FIG. 25). The bottom of the areas 274, which may have a depth of 0.075-0.080 inch, does not go below the radial tips of the Y-cross-section helical cutting elements 258.

In accordance with a further aspect of the invention, provision is made in the machine 220 for regulating the feed rate of product to the machine in proportion to the meat/bone ratio in the material to be processed. Accordingly, where there is high meat content compared to the bone content of the raw material, the latter is given more time to go through the machine than raw material with a low meat/bone ratio.

The foregoing is accomplished in the present instance by providing the hopper 232 of the machine with a movable baffle 265 that can be set at any desired location in the hopper axially of the rotor (FIGS. 29-32). The baffle 265 may be constructed of stainless steel and clamped in any desired position as by thumb screws 266 to adjust the holding capacity of the hopper. As shown in FIGS. 31 and 32, the baffle conforms to the profile of the hopper and a section of the rotor periphery. Thus where the raw material has a low meat/bone ratio, the baffle 265 may be set, as shown in FIG. 29, to move the raw material rapidly through the machine. On the other hand, where the raw material has a high meat/bone ratio, the baffle 265 may be set, as shown in FIG. 30, to move the raw material more slowly through the machine and thereby allow sufficient time for high recovery of the edible meat from the bone and other hard tissues.

Third Deboning Machine

Figure 33:
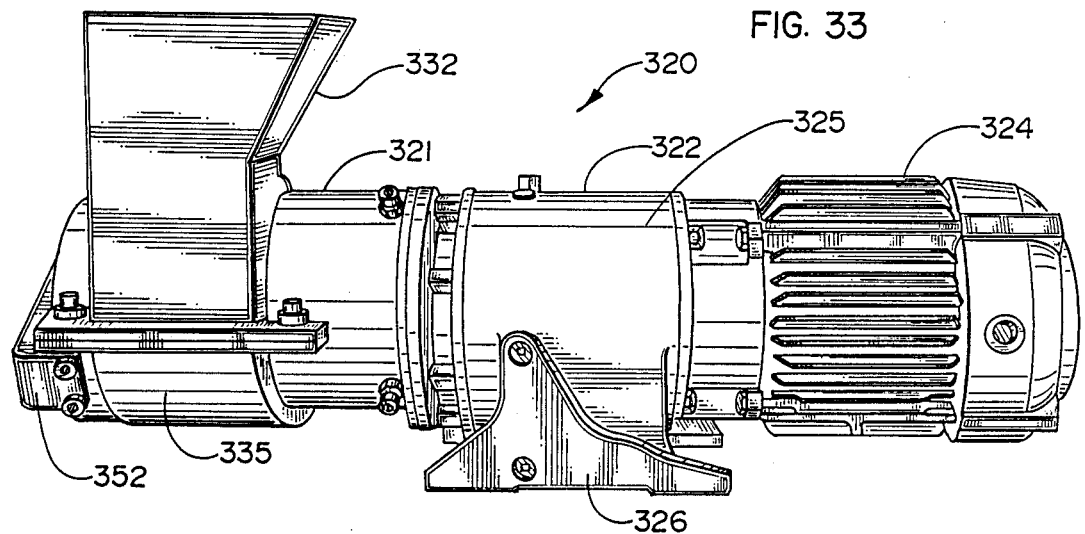
FIG. 33 is a side elevational view of still another form of deboning exemplifying the present invention.
Figure 34:
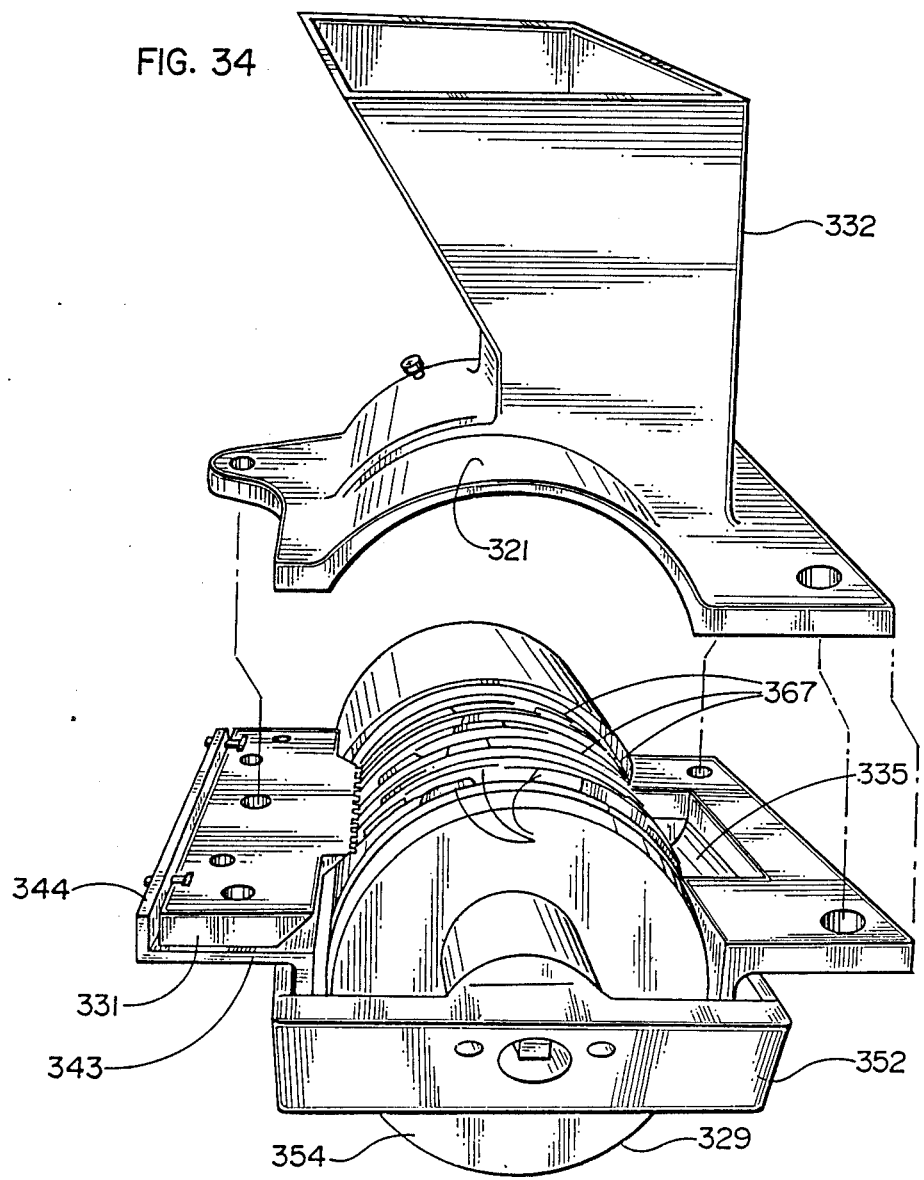
FIG. 34 is an exploded perspective view of the hopper and upper casing of the machine of FIG. 33, together with the rotor, pressure/breaker bar, and digester pocket of the machine.
Figure 49:
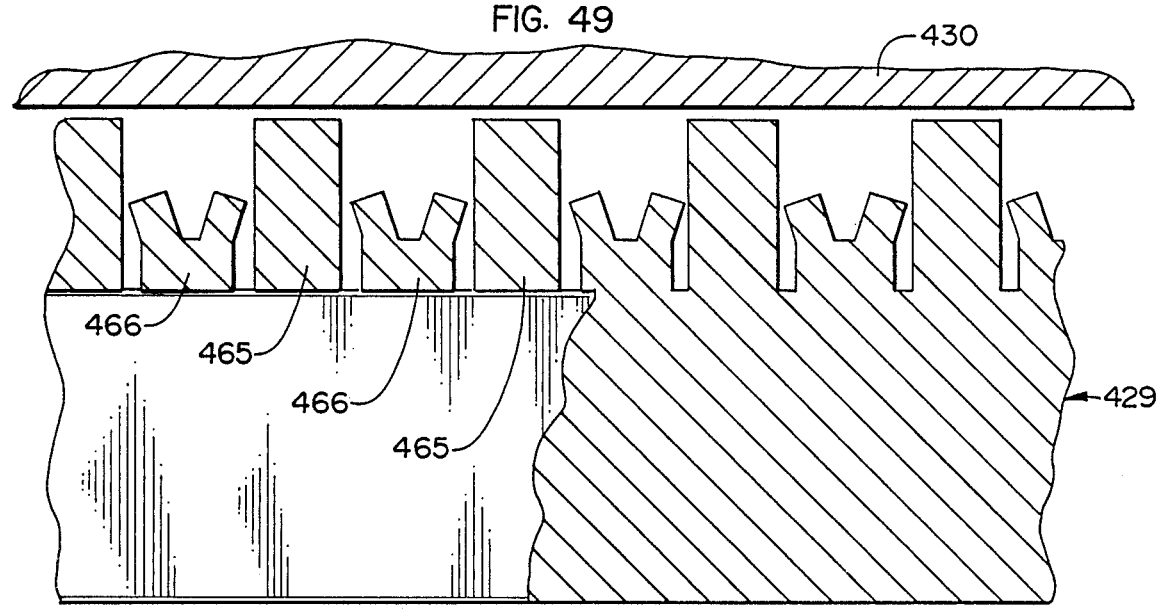
FIG. 49 is a further enlarged, fragmentary transverse sectional view taken through a portion of the plain section of the rotor in the plane of the line 49—49 in FIG. 10.
Figure 50:
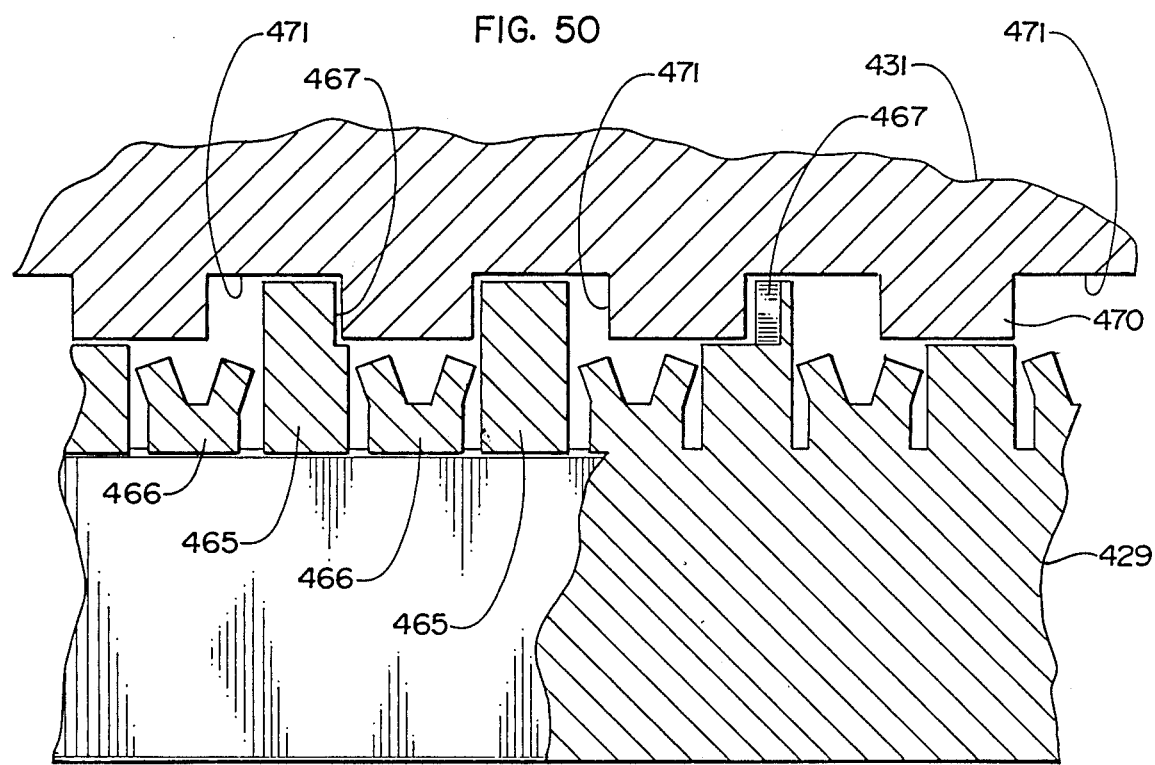
FIG. 50 is a further enlarged, fragmentary transverse sectional view taken through a portion of the toothed section of the rotor in the plane of the line 50—50 in FIG. 46.

Turning next to FIGS. 33 and 34, another model of deboning machine 320 is there shown in which the present invention is also exemplified. This machine happens to be of smaller capacity than the machines 120 and 220 described above but is basically similar in construction. The machine 320 comprises a casing 321 mounted on a drive unit 322. The latter includes a drive motor 324, reduction gear 325 and connecting frame 326. The casing 321 houses power driven rotor 329 and a pressure/breaker bar 331. Raw material such as whole poultry or fish carcasses, shellfish, or bone-in cuts of beef, pork or lamb, is fed directly into the hopper 332 and a feed opening in the top wall of the casing. The opening communicates with a relatively large arcuate digesting pocket 335 spaced outwardly from the rotor and extending generally spirally therearound for approximately 180 degrees. The radial depth of the pocket 335 decreases in the direction of rotor rotation which is clockwise as viewed in FIG. 34.

The rotor 329 of the machine 320 is constructed with helical cutting elements similar to those of the machine 220 described above. It also has a fixed auger within the rotor for facilitating the discharge of edible meat. The teeth 367 on the exterior of the rotor 329 are similar to those of the rotor 229 but in this case are formed with somewhat greater arcuate length, as shown in FIG. 34.

The teeth 359 on the pressure/breaker bar 331 are interdigitated with the teeth 367 on the rotor in the same manner as in the machine 120 and are constructed in basically the same way as in the machine 120. The toothed areas of both the rotor 329 and the pressure/breaker bar 331 extend substantially the full length of the rotor.

Fourth Deboning Machine

Referring more specifically to FIGS. 35-38, the invention is there exemplified in still another mechanical deboning machine 420. This machine is generallly similar to the deboning machines 120 and 220, supra, but differs in certain respects noted below.

As to similarities, the machine 420 comprises casing 421; drive unit 422 with motor 424, reduction gear 425, and connecting frame 426; support frame 428; power driven rotor 429; main pressure bar 430; auxiliary pressure bar 431; hopper 432 and feed opening 434 in the top of the casing; and a large arcuate digesting pocket 435 extending spirally around the rotor for 180 degrees, decreasing in thickness in the direction of rotor rotation.

Raw material in the form of whole poultry or fish carcasses, shellfish, or bone-in cuts of beef, pork or lamb, is fed directly into the hopper 432, through the feed opening 434, and into the digesting pocket 435. Upon rotation of the rotor 429, the toothed cutting elements thereof coact with the right hand wall of hopper 432 and the inner arcuate wall of the pocket 435, and also with the configuration of the auxiliary pressure bar 431, to break the raw material into a coarse agglomeration of hard and soft tissues. Edible meat with no perceptible bone is forced by the pressure bars 430, 431 into the rotor through constricted helical grooves in the peripheral wall thereof. Under the guidance of fixed auger 436 within the rotor, the edible comminutd meat exits via discharge apertures 438 in the driven end of the rotor and underlying aperture 439 in the machine casing. It is collected in a meat receptacle 440 as shown in FIG. 35. The by-product of waste material which may consist of hard tissues of bone, sinew, cartilage and stringy connective tissue is trapped on the outer periphery of the rotor and positively driven toward the outboard end thereof where it is dischared and collected in waste receptacle 441, also shown in FIG. 35.

As to differences, the main pressure bar 430 (FIGS. 35-39) is mounted on a base flange 442 which turns outwardly from the casing wall. The flange 442 locates the pressure bar 430 with its medial plane in or near coincidence with the horizontal axial plane of the rotor 429. The main pressure bar 430 may be adjusted for a clearance of 0.002-0.004 inch with respect to the rotor as by means of adjusting screws 444 carried by brackets 445 fixed to the base flange 442. The main pressure bar is secured in adjusted position as by means of hold-down bolts 446 which pass through clearance slots 448 in the pressure bar and engage tapped holes in the base flange 442.

The auxiliary pressure bar 431 (FIGS. 36-38, 41-45) is mounted on base flange 449 which, like the base flange 442, turns outwardly from the casing wall. The base flange 449 locates the auxiliary pressure bar 431 so that its medial plane will be in or near coincidence with the horizontal axial plane of the machine rotor. The pressure bar 431 may be adjusted for a rotor clearance of 0.002-0.004 inch by means of adjusting screws 450 carried by brackets 51 secured to base flange 449. The bar is maintained in adjusted position by hold-down bolts 452 which pass through clearance apertures in the pressure bar 431.

The rotor 429 (FIGS. 37, 46-50) is a hollow cylindrical member fashioned with helical cutting elements generally similar to those disclosed in my prior patent 3,659,638 mentioned earlier herein. The rotor is journaled in the machine casing 421 and power driven from the output shaft 455 of reduction gear 425. The inboard end of the rotor is supported by means of hub 456 and end plate 458, the latter including the meat discharge apertures 438. At its outboard end, the rotor 429 is journaled in a main support bearing 459 mounted on a diametrical bracket 460 which extends across the end of the casing (FIGS. 35-37). The outer end of the rotor is closed by end cap 461 centered in the bearing 459. The end cap maintains a running clearance with the projecting outboard end 462 of the fixed auger 436 which is held against rotation by means of a fixed socket plate 464.

As indicated above, the rotor 429 is formed with a plurality of helical cutting elements 465, 466 disposed in axially spaced relation on its periphery after the manner disclosed in my prior patent No. 3,659,638. The elements 465 are of generally rectangular cross-section and are of somewhat greater diameter than the elements 466 which are of generally Y-shaped cross-section. The grooves separating the cutting elements 465, 466 at the outer peripheral surface may be approximately 0.008-0.010 inch in width. At their inner ends, these grooves open out to approximately 0.020 inch in width. The distance between adjacent ones of the helical cutting elements 465 may be on the order of 0.136 inch. The radial difference between the radial extremities of the Y-shaped cutting elements 466 and the radial extremities of the rectangular cross-section cutting elements 465 may be on the order of 0.060-0.070 inch. The constricted grooves between the cutting elements 465, 466 communicate between the interior of the rotor and the pressure pocket or pockets defined by the radial extremities of the cutting elements 465, 466 and the pressure bar.

In accordance with the invention, provision is made in the machine 420 for directly accepting raw material in the form of whole poultry or fish carcasses, shellfish, or bone-in cuts of beef, pork or lamb, without first subjecting such material to a separate coarse griding step outside the deboning machine. This is accomplished in the present instance by constructing the rotor 429 and auxiliary pressure bar 431 in the region of the arcuate digesting pocket 435 with a plurality of interdigitated sets of teeth. The latter are disposed in close clearance with each other such, for example, as 0.005 inch.

Turning first to the teeth 467 on the rotor (FIGS. 46-50), it will be noted that the toothed area is confined approximnately to that length of the rotor which registers with the arcuate digesting pocket 435. The teeth of the rotor are defined by two pairs of intersecting grooves 468, 469 which cut through the helical cutting elements of rectangular cross-section. These intersecting grooves are close to but radially outboard of the extremities of the helical cutting elements 466 of Y-shaped cross-section. In other words, if an imaginary cylinder were drawn tangent to the extremities of the Y-shaped cutting elements, the tooth defining grooves in the rectangular cross-section cutting elements 465 would all be radially outward from such imaginary cylinder. The depth of such grooves may, for example, be on the order of 0.060-0.090 inch.

The first set of rotor grooves 468 are defined by a relatively high pitch spiral. For example, in a machine rotor with an outer diameter of approximately 7.725 inches, the pitch of such spiral would be approximately 16 inches per turn of the rotor. The second set of rotor grooves 469 has zero pitch, being oriented in a plane perpendicular to the rotational axis of the rotor. The width of these grooves would be on the order of 0.138 inch and their depth would be on the order of 0.085–0.100 inch. By reason of this construction, the rotor surface in the vicinity of the digester pocket 435 is provided with numerous upstanding cutting teeth 467 of rhomboidal cross-section. Many of them are of complete rhomboidal form, while others, depending upon how they are intersected by the perpendicular grooves 469, are completely eliminated.

Turning now to the auxiliary pressure bar 431 (FIGS. 36–38, 41–44), it will be noted that the inner edge portion of the bar which cooperates with the rotor has a plurality of angular teeth 470 alternating with corresponding grooves 471. In the present instant, the teeth of the pressure bar 431 happen to be on the order of 0.134 inch in width, while the grooves between them happen to be on the order of 0.138 inch wide. The depth of the teeth of pressure bar 431 may be on the order of 0.085–0.100 inch, the bar being adjusted to allow approximately 0.003–0.005 inch clearance with the rotor. The angle of the tooth faces on the auxiliary pressure bar 431 may be on the order of 30 to 60 degrees from the vertical, defining an angular pressure pocket extending in the direction of rotation on the rotor face for engaging material on the surface thereof.

Referring next to FIGS. 43 and 45, a slightly modified form of auxiliary pressure bar 431A is there shown with the angle of the tooth faces and the angle of the intervening grooves the same. In this instance, the teeth run for almost the full thickness of the pressure bar, with a slight chamfer at the bottom. This tends to lengthen the pressure pocket and permit engagement of more material than in the case of the bar 431.

In order to avoid a build-up of raw material on the peripheral surface of the rotor 429, one or more relief areas 474 may be defined thereon. As indicated in FIG. 37, in the present instance two diametrically opposed areas 474 are provided. Each such area may have a length comparable to the active length of the auxiliary pressure bar and a width on the order of one inch. The bottom of the areas 474, which may have a depth of 0.075–0.080 inch, does not go below the radial tips of the Y-cross-section helical cutting elements 466.

In accordance with a further aspect of the invention, the main pressure bar 430 is constructed to provide increased efficiency in the machine 420. As will be noted from FIG. 39, the pressure bar 430 has a large relief notch 472 which registers with the digester pocket 435. The pressure bar 430 is thus disposed for engagement with the helical cutting elements on that portion of the rotor situated outside the digester pocket The pressure bar 430 is constructed and arranged so that it will have a clearance between its lower edge portion and the rotor on the order of 0.002–0.004 inch. As will be evident from FIG. 40C, the face of the pressure bar 430 adjacent the rotor at the end of the relief notch 472 may define an acute angle on the order of 15 degrees with the vertical, the apex of the angle extending in the direction of rotation of the rotor. This angle decreases progressively toward the outboard end of the pressure bar, as indicated in FIGS. 40B and 40A. Such arrangement provides the pressure bar with a skewed surface 475 changing gradually from inclined to purely vertical and thereby progressively decreasing the width of the pressure pocket which exists between the pressure bar and the coacting surface of the rotor. This causes a progressive squeeze on the material in the pressure pocket along the bar 430 and thereby tends to increase the yield of edible meat from the agglomeration of material on the surface of the rotor.

Method of Separating Animal, Fruit or Vegetable Meat from Hard or Tough Tissue

In accordance with a related aspect of the invention, a method has been developed for mechanically separating animal, fruit or vegetable meat from bone, cartilage, sinew, skin, stems, seeds, and other hard or tough tissue. The method makes it possible to extract high quality, edible meat from the raw material expeditiously and effeciently at production rates not previously attained. The term "meat" as used in this context, embraces not only the edible meat from animals but also the edible material enclosed within the skin of fruits and vegetables.

The raw material used in the application of this method may consist of unground whole poultry or fish carcasses, shellfish, or bone-in cuts of beef, pork or lamb, or fruit or vegetables. The method comprises the steps of providing a rotor having closely spaced helical cuttign elements; defining a plurality of cutting teeth on certain of these helical cutting elements lying in planes substantially perpendicular to the rotor axis; providing a breaker bar defining with the rotor a wedge shaped pocket of progressively decreasing thickness in the direction of rotation of the rotor; providing a spiral shaped digesting pocket which receives raw material and forces it into the wedge shaped pocket; and providing a plurality of parallel grooves and teeth in the breaker bar registering with the cutting teeth of the helical cutting elements so that the raw material is pulled, cut, pressed, wedged and forced into the wedge shaped pocket and separates into edible meat forced between the helical cutting elements where it is collected, and into waste material on the outside of the helical cutting elements which eject it.

I claim as my invention:

1. A method of mechanically separating meat from an agglomeration of waste material said method comprising the steps of:
   (a) feeding said agglomeration and meat to a rotor having closely spaced helical cutting elements;
   (b) engaging said agglomeration and meat with a plurality of cutting teeth on certain of said helical cutting elements extending in planes substantially perpendicular to the rotor axis;
   (c) forcing said agglomeration and meat between a breaker bar and said rotor into a wedge shaped pocket of progressively decreasing thickness in the direction of rotation of the rotor; and
   (d) said breaker bar having a plurality of parallel grooves and teeth registering interdigitally with the cutting teeth of said helical cutting elements, whereby the meat is separated from the waste material by pulling, cutting, pressing, and wedging said agglomeration and meat by forcing said agglomeration and meat into said wedge shaped pocket between the teeth of said breaker bar, moving the meat through the helical cutting elements into a collecting receptacle, and retaining the waste material on the outside of said helical cutting elements which eject it into a waste receptacle.

2. A method as defined in claim 1 wherein said meat is plant meat.

3. A mechanical desinewing and deboning machine having a casing enclosing a hollow, power driven rotor journaled on a rotational axis, two sets of helical cutting elements defining constricted helical passages therebetween communicating with the interior of the rotor, said casing also having a feed hopper communicating with a digesting pocket surrounding a portion of the rotor, sad machine comprising, in combination:
- (a) one set of said helical cutting elements having a substantially greater radial length than said other set of helical cutting elements;
- (b) a plurality of arcuate cutting teeth defined in certain of said helical cutting elements of greater radial length, said arcuate cutting teeth lying in planes substantially perpendicular to said rotor axis;
- (c) a pressure/breaker bar fixed closely adjacent said rotor and having a set of teeth interdigitated with said arcuate cutting teeth of said rotor; and
- (d) said pressure/breaker bar defining with respect to the peripheral surface of said rotor a wedge shaped, arcuately grooved pocket decreasing in size in the direction of rotation of the rotor.

4. A mechanical desinewing and deboning machine as set forth in claim 3, wherein said teeth of said pressure/breaker bar have their outer end faces disposed at an angle of approximately 56 degrees from horizontal.

5. A mechanical desinewing machine as defined in claim 3, wherein the rotor is divided lengthwise into three zones, wherein the clearance between said helical cutting elements of greater radial length and said helical cutting elements of shorter radial length along the peripheral surface of said rotor is 0.027.0–029 inch for the inboard third zone of rotor length; is 0.023–0.025 inch for the middle third zone of rotor length; and 0.019–0.021 inch for the outboard third zone of rotor length.

6. A mechanical desinewing and deboning machine as defined in claim 3, wherein said sets of helical cutting elements on said rotor have a pitch of approximately 0.200–0.250 inch.

7. A mechanical deboning and desinewing machine as set forth in claim 3, wherein said arcuate cutting teeth which interdigitate with said pressure/breaker bar are distributed around said rotor in helical bands with untoothed areas of helical shape interposed between the bands of teeth to increase the amount of raw material processed by said machine.

8. The combination set forth in claim 3, wherein said interdigitated teeth are situated in the region of said wedge shaped pocket.

9. In a mechanical deboning machine having a generally cylindrical casing enclosing a hollow, power driven rotor with helical cutting elements and initially constricted helical passages communicating with the interior thereof, a pressure/breaker bar mounted in closely spaced relation with the rotor, and a feed hopper communicating with a large spiral digesting pocket underlying a portion of the rotor, the combination comprising:
- (a) means defining a plurality of arcuate teeth projecting radially from said rotor and distributed along substantially its entire length;
- (b) means defining a plurality of teeth projecting from said pressure/breaker bar and extending axially for substantially the entire length of the rotor;
- (c) said teeth of said rotor and said teeth of said pressure/breaker bar being interdigitated and adapted to break up unground raw material into an agglomeration of fragmented hard and soft tissues which are separated by coaction between the rotor and pressure bar into comminuted edible meat which enters said rotor and discharges therefrom into a meat receptacle, and into fragmented bone and hard tissue on the outside of the rotor which are ejected.

10. A mechanical desinewing and deboning machine as set forth in claim 9, wherein said teeth have a arcuate configuration varying in length from approximately 5 degrees to 240 degrees and each arcuate cutting tooth has a leading edge sloped rearwardly at an angle of approximately 50 degrees to prevent impact damage.

11. A mechanical deboning machine according to claim 9, wherein each said arcuate tooth, in turn, is fashioned with a series of longitudinally spaced undercut teeth extending transversely across its outer peripheral portion.

12. The combination set forth in claim 11, wherein said helical cutting elements comprise a plurality of ribs of generally Y-shaped cross section, and said radially projecting teeth on said rotor are situated outward from the radial extremities of said Y-shaped cross section ribs.

13. The combination set forth in claim 12, wherein said radially projecting teeth of said rotor have a rectangular cross section.

14. The combination set forth in claim 12, wherein said radially projecting teeth of said rotor are defined by one set of grooves of high pitch and another set of grooves of zero pitch.

15. The combination set forth in claim 11, wherein said rotor has one or more relief areas on its radially toothed portion.

16. In a mechanical deboning machine having a generally cylindrical casing enclosing a hollow, power driven rotor with helical cutting elements and initially constricted helical passages communicating with the interior of the rotor, a main pressure bar mounted in closely spaced relation with the rotor, an auxiliary pressure bar also mounted in closely spaced relation with the rotor, and a feed hopper communicating with a large spiral shaped digesting pocket underlying a portion of the rotor, the combination comprising:
- (a) said helical cutting elements being defined as a plurality of teeth of rectangular cross section projecting radially from said rotor;
- (b) means defining a plurality of teeth projecting from said auxiliary pressure bar;
- (c) said teeth of said rotor and said teeth of said auxiliary pressure bar being interdigitated and adapted to break up unground raw material into an agglomeration of fragmented hard and soft tissue which are separated by coaction between the rotor and pressure bars into comminuted edible meat which passes through the rotor to a collection receptacle, and fragmented bone and hard tissue which accumulates on the outside of the rotor and is ejected.

17. The combination set forth in claim 16, wherein said radially projecting teeth of said rotor have a rectangular cross section.

18. The combination set forth in claim 17, wherein said radially projecting teeth of said rotor are of rhomboidal cross section.

19. The combination set forth in claim 16, wherein said radially projecting teeth of said rotor are defined by one set of grooves of high pitch and another set of grooves of zero pitch.

20. The combination set forth in claim 16, wherein said rotor has one or more relief areas on its radially toothed portion.

* * * * *